United States Patent
Eriksson Löwenmark et al.

(10) Patent No.: US 12,136,966 B2
(45) Date of Patent: Nov. 5, 2024

(54) FREQUENCY OFFSET IN NON-TERRESTRIAL NETWORKS

(71) Applicant: Telefonaktiebolaget LM Ericsson (publ), Stockholm (SE)

(72) Inventors: Stefan Eriksson Löwenmark, Färentuna (SE); Talha Khan, Santa Clara, CA (US); Xingqin Lin, Santa Clara, CA (US); Helka-Liina Määttänen, Helsinki (FI); Sebastian Euler, Storvreta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 511 days.

(21) Appl. No.: 17/290,616

(22) PCT Filed: Nov. 1, 2019

(86) PCT No.: PCT/EP2019/080001
§ 371 (c)(1),
(2) Date: Apr. 30, 2021

(87) PCT Pub. No.: WO2020/089471
PCT Pub. Date: May 7, 2020

(65) Prior Publication Data
US 2022/0038139 A1 Feb. 3, 2022

Related U.S. Application Data

(60) Provisional application No. 62/755,072, filed on Nov. 2, 2018.

(51) Int. Cl.
*H04B 7/01* (2006.01)
*H04B 7/185* (2006.01)
*H04W 72/23* (2023.01)

(52) U.S. Cl.
CPC ........... *H04B 7/01* (2013.01); *H04B 7/18513* (2013.01); *H04W 72/23* (2023.01)

(58) Field of Classification Search
CPC .. H04B 7/18513; H04B 7/01; H04B 7/18508; H04B 7/2125; H04B 7/1855;
(Continued)

(56) References Cited

U.S. PATENT DOCUMENTS

| | | | |
|---|---|---|---|
| 6,114,992 A | 9/2000 | Underbrink | |
| 6,464,643 B1 | 10/2002 | Brock-Fisher | |

(Continued)

FOREIGN PATENT DOCUMENTS

| | | |
|---|---|---|
| CN | 105474740 B | 12/2019 |
| EP | 0848509 A1 | 6/1998 |

(Continued)

OTHER PUBLICATIONS

3GPP TR 38.811 V15.1.0; 3rd Generation Partnership Project; Technical Specification Group Radio Access Network; Study on New Radio (NR) to support non terrestrial networks (Release 15); Jun. 2019, consisting of 126-pages.

(Continued)

*Primary Examiner* — Allahyar Kasraian
(74) *Attorney, Agent, or Firm* — Weisberg I.P. Law, P.A.

(57) ABSTRACT

Methods and apparatus for obtaining a frequency offset corresponding to a Doppler shift of transmission and/or reception frequencies between a wireless device and a network node. In one embodiment a method is performed by a wireless device for operating in a non-terrestrial network, NTN, the NTN having at least one network node and a communication satellite, wherein the at least one network node is one of a terrestrial base station and a satellite base station or satellite gateway, the method includes obtaining a frequency offset corresponding to a Doppler shift of trans- (Continued)

mission and/or reception frequencies between the wireless device and the network node and applying the frequency offset to an uplink transmission to the network node.

17 Claims, 18 Drawing Sheets

(58) Field of Classification Search
CPC ............ H04W 56/0035; H04W 4/027; H04W 84/005; H04W 84/06; H04W 28/18; H04W 72/21; H04W 72/23; H04W 64/006; H04W 56/0025; H04W 4/029
See application file for complete search history.

(56) References Cited

U.S. PATENT DOCUMENTS

| | | | |
|---|---|---|---|
| 6,529,485 | B1 | 3/2003 | Agarwal et al. |
| 6,701,127 | B1 | 3/2004 | Wreschner et al. |
| 7,283,091 | B1 | 10/2007 | Loomis |
| 7,327,311 | B2 | 2/2008 | Dooley et al. |
| 2002/0105457 | A1 | 8/2002 | Dooley et al. |
| 2002/0105458 | A1* | 8/2002 | Dooley .................. G01S 19/235 375/150 |
| 2003/0012293 | A1 | 1/2003 | Laurent et al. |
| 2004/0082303 | A1 | 4/2004 | Giannakis et al. |
| 2007/0058683 | A1* | 3/2007 | Futami ................ H04L 27/0014 370/516 |
| 2009/0303117 | A1 | 12/2009 | Boiero et al. |
| 2010/0246720 | A1 | 9/2010 | Wang et al. |
| 2011/0116386 | A1* | 5/2011 | Blanchard .............. H04B 7/155 370/242 |
| 2011/0142115 | A1 | 6/2011 | Wang et al. |
| 2014/0378084 | A1 | 12/2014 | Preteseille et al. |
| 2016/0278033 | A1* | 9/2016 | Wu .................... H04W 56/0015 |
| 2017/0373907 | A1* | 12/2017 | Tan ........................... H04L 5/14 |
| 2018/0205589 | A1* | 7/2018 | Bai ..................... H04L 27/2672 |
| 2018/0330611 | A1 | 11/2018 | Jiang et al. |
| 2019/0313357 | A1* | 10/2019 | Wang ................ H04W 56/0045 |
| 2019/0327762 | A1 | 10/2019 | Takeda et al. |

FOREIGN PATENT DOCUMENTS

| | | |
|---|---|---|
| WO | 2018160682 A1 | 9/2018 |
| WO | 2019097855 A1 | 5/2019 |
| WO | 2020031120 A2 | 2/2020 |

OTHER PUBLICATIONS

3GPP TSG RAN WG1 Meeting #96bis R1-1904644; Title: Doppler compensation in initial access procedure in NR-NTN; Agenda Item: 7.2.5.2; Source: MediaTek Inc.; Document for: Discussion and Decision; Location and Date: Xi'an, China, Apr. 8-Apr. 12, 2019, consisting of 5 pages.
3GPP TSG RAN WG1 #98 R1-1908984; Title: NTN operation for Doppler and Timing Advance; Agenda Item: 7.2.5.3; Source: OPPO; Document for: Discussion; Location and Date: Prague, Czech, Aug. 26-30, 2019, consisting of 4 pages.
3GPP TSG-RAN WG1 Meeting #98 R1-1909107; Title: On frequency compensation, uplink timing and random access in NTN; Agenda Item: 7.2.5.3; Source: Ericsson; Document for: Discussion; Location and Date: Prague, Czech Republic, Aug. 26-30, 2019, consisting of 18 pages.
3GPP TSG-RAN WG1 Meeting #102-e R1-2005502; Title: On UL time and frequency synchronization enhancements for NTN; Agenda Item: 8.4.2; Source: Ericsson; Document for: Discussion; Location and Date: e-Meeting, Aug. 17-28, 2020, consisting of 13 pages.
3GPP TSG-RAN WG2 #106 Tdoc R2-1907296; Title: On random access procedures for NTN; Agenda Item: 11.6.3.1; Source: Ericsson; Document for: Discussion, Decision; Location and Date: Reno, Nevada, US, May 13-May 17, 2019, consisting of 5 pages.
International Search Report and Written Opinion dated Feb. 19, 2020 for International Application No. PCT/EP2019/080001 filed Nov. 1, 2019, consisting of 15-pages.
3GPP TSG RAN Meeting #79 RP-180543 (revision of RP-180333); Title: NR-NTN; NR impact area identification, initial downlink synchronisation; Agenda Item: 9.3.1 (SID = sFS_NR_nonterr_nw); Source: Thales; TDOC Type: pCR; Document for: Approval; Release: REL-15; Specification: 38.811 (SID = sFS_NR_nonterr_nw); Date and Location: Mar. 19-23, 2018, Chennai, India, consisting of 7-pages.
3GPP TR 38.811 V15.0.0; 3rd Generation Partnership Project; Technical Specification Group Radio Access Network; Study on New Radio (NR) to support non terrestrial networks (Release 15); Jun. 2018, consisting of 118-pages.
3GPP TSG RAN meeting #79 RP-181370; Title: Study on solutions evaluation for NR to support Non Terrestrial Network; Agenda Item: 9.1.17 Study on solutions evaluation for NR to support Non Terrestrial Network, moderator: Thales; Source: Thales; Type: SID new; Document for: Approval; Date and Location: Jun. 11-14, 2018, La Jolla, USA, consisting of 5-pages.
European Search Report dated Dec. 19, 2023 for Application No. 20754835.5, consisting of 5 pages.
Indian Hearing Notice dated Jan. 10, 2024 for Application No. 202117022271, consisting of 3 pages.
3GPP TSG RAN WG1 Meeting #97 R1-1905994; Title: Discussion on timing advance and RACH for NTN; Agenda Item: 7.2.5.3; Source: Huawei, HiSilicon; Document for: Discussion and Decision; Location and Date: Reno, USA, May 13-17, 2019, consisting of 10 pages.

* cited by examiner

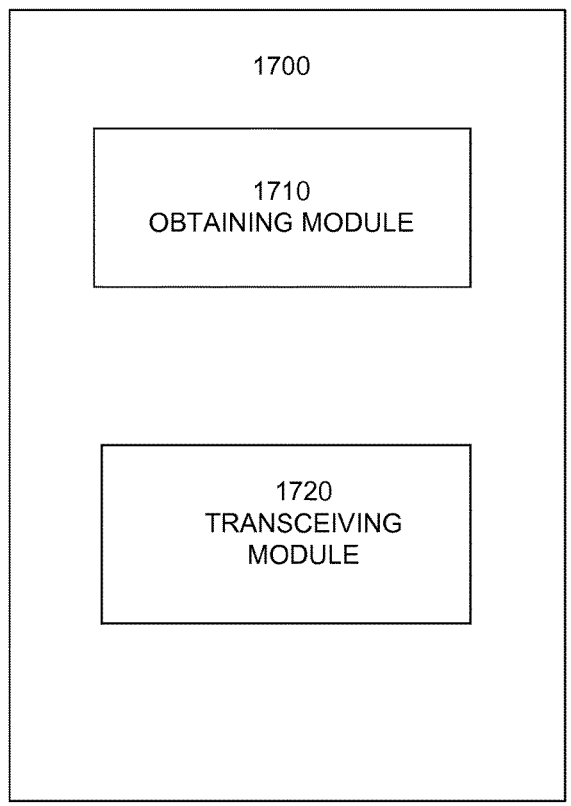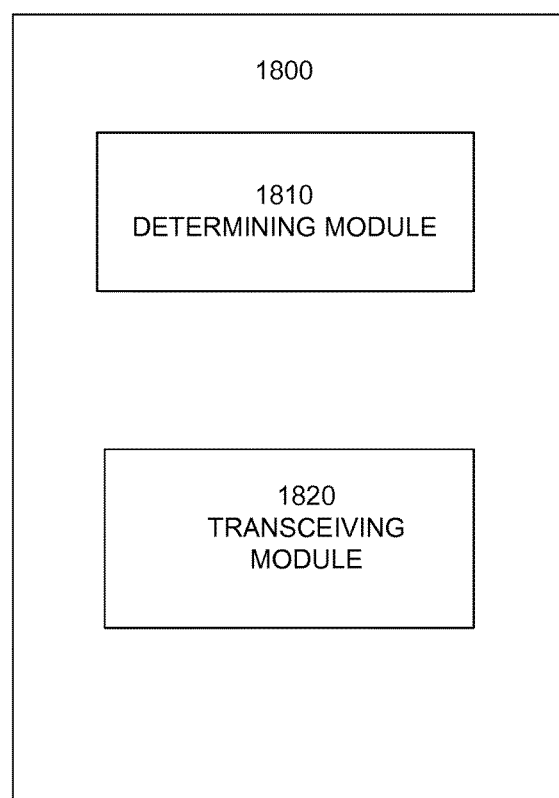
FIG. 17
FIG. 18

FREQUENCY OFFSET IN NON-TERRESTRIAL NETWORKS

CROSS-REFERENCE TO RELATED APPLICATIONS

This application is a Submission Under 35 U.S.C. § 371 for U.S. National Stage Patent Application of International Application No.: PCT/EP2019/080001, filed Nov. 1, 2019 entitled "FREQUENCY OFFSET IN NON-TERESTRIAL NETWORKS," which claims priority to U.S. Provisional Application No. 62/755,072, filed Nov. 2, 2018, the entireties of both of which are incorporated herein by reference.

TECHNICAL FIELD

Embodiments herein relate generally to a wireless device and a base station and in particular to obtaining a frequency offset for transmission or reception between the wireless device and the base station when operating with non-terrestrial networks.

BACKGROUND

There is an ongoing resurgence of satellite communications. Several plans for satellite networks have been announced in the past few years. The target services vary, from backhaul and fixed wireless, to transportation, to outdoor mobile, to IoT. Satellite networks could complement mobile networks on the ground by providing connectivity to underserved areas and multicast/broadcast services.

To benefit from the strong mobile ecosystem and economy of scale, adapting the terrestrial wireless access technologies including $3^{rd}$ Generation Partnership Project (3GPP) Long Term Evolution (LTE) and New Radio (NR) for satellite networks is drawing significant interest. For example, 3GPP completed an initial study in Release 15 on adapting NR to support non-terrestrial networks (mainly satellite networks), see 3GPP TR 38.811 V15.0.0 (2018-08-10). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks, see for example "Study on solutions evaluation for NR to support non-terrestrial Network", 3GPP tdoc RP-181370.

A satellite radio access network usually includes the following components:

Gateway that connects satellite network to core network

Satellite that refers to a space-borne platform

Terminal that refers to user equipment

Feeder link that refers to the link between a gateway and a satellite

Service link that refers to the link between a satellite and a terminal

The link from gateway to terminal is often called forward link, and the link from terminal to gateway is often called return link. Depending on the functionality of the satellite in the system, we can consider two transponder options:

Bent pipe transponder: satellite forwards the received signal back to the earth with only amplification and a shift between service link frequency and feeder link frequency.

Regenerative transponder: satellite includes on-board processing to demodulate and decode the received signal and regenerate the signal before sending it back to the earth.

Depending on the orbit altitude, a satellite may be categorized as low Earth orbit (LEO), medium Earth orbit (MEO), or geostationary (GEO) satellite:

LEO: typical heights ranging from 250-1,500 km, with orbital periods ranging from 90-130 minutes.

MEO: typical heights ranging from 5,000-25,000 km, with orbital periods ranging from 2-14 hours.

GEO: typical height is about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometres to a few thousands of kilometres.

FIG. 1 shows an example architecture of a satellite network 30. The non-terrestrial network comprises communications satellites 10 communicating with terrestrial Gateways 20 which are then in communication with terrestrial Base Station 40, e.g. gNB. The communications satellite create the cell in the form of a Spotbeam or spot beam footprint 50 to provide cellular service to wireless devices, eg. UE, 60. In some examples as shown by the Feeder link and Service link the communications satellite 10 comprises a bent pipe transponder.

The two main physical phenomena that affect satellite communications system design are the long propagation delay and Doppler effects. The Doppler effects are especially pronounced for LEO satellites.

Propagation delay is a main physical phenomenon in a satellite communication system that makes the design different from that of a terrestrial mobile system. For a bent pipe satellite network, the following delays are relevant.

One-way delay: from the BS to the UE via the satellite, or the other way around

Round-trip delay: from the BS to the UE via the satellite and from the UE back to the BS via the satellite Differential delay: the delay difference of two selected points in the same spotbeam Note that there may be additional delay between the ground BS antenna and BS, which may or may not be collocated. This delay depends on deployment. If the delay cannot be ignored, it should be taken into account in the communications system. The propagation delay depends on the length of the signal path, which further depends on the elevation angles of the satellite seen by the BS and UE on the ground. The minimum elevation angle is typically more than 100 for UE and more than 50 for BS on the ground. These values will be assumed in the delay analysis below.

The following Tables 1 and 2 are taken from 3GPP TR 38.811, see above. The round-trip delay is much larger in satellite systems. For example, it is about 545 ms for a GEO satellite system. In contrast, the round-trip time is normally no more than 1 ms for typical terrestrial cellular networks.

TABLE 1

Propagation delays for GEO satellite at 35,786 km

| | | GEO at 35786 km | |
|---|---|---|---|
| Elevation angle | Path | D (km) | Time (ms) |
| UE: 10° | satellite - UE | 40586 | 135.286 |
| GW: 5° | satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite -UE | 40586 | 135.286 |
| Round Trip Time | Satellite-UE-Satellite | 81172 | 270.572 |

TABLE 2

Propagation delays for Non-Geostationary Orbit (NGSO) satellites

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite - UE | 1932.24 | 6,440 | 3647.5 | 12,158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Generally, within spot beam covering one cell, the delay can be divided into a common delay component and a differential delay component. The common delay is the same for all UEs in the cell and is determined with respect to a reference point in the spot beam. In contrast, the differential delay is different for different UEs which depends on the propagation delay between the reference point and the point at which a given UE is positioned within the spot beam.

The differential delay is mainly due to the different path lengths of the service links, since the feeder link is normally the same for terminals in the same spotbeam. Further, the differential delay is mainly determined by the size of the spotbeam. It may range from sub-millisecond (for spotbeam on the order of tens of kilometres) to tens of millisecond (for spotbeam on the order of thousands of kilometres).

Doppler is another major physical phenomenon that needs to be taken into account when designing a satellite communication system. The following Doppler effects are particularly relevant.

Doppler shift: the shift of the signal frequency due to the motion of the transmitter, the receiver, or both.

Doppler variation rate: the derivative of the Doppler shift function of time, i.e., it characterizes how fast the Doppler shift evolves over time.

Doppler effects depend on the relative speed of the satellites and the UE and the carrier frequency.

For GEO satellites, they are fixed in principle and thus do not induce Doppler shift. In reality, however, they move around their nominal orbital positions due to for example perturbations. A GEO satellite is typically maintained inside a box.

+/−37.5 km in both latitude and longitude directions corresponding to an aperture angle of +/−0.050

+/−17.5 km in the equatorial plane

And the trajectory of the GEO satellite typically follows is a figure "8" pattern, as illustrated in FIG. 2a.

Table 3 gives example Doppler shifts of GEO satellites. For a GEO satellite maintained inside the box and moving according to the figure "8" pattern, we can see that the Doppler shifts due to the GEO satellite movement are negligible.

If a GEO satellite is not maintained inside the box, the motion could be near GEO orbit with inclination up to 6°. The Doppler shifts due to the GEO satellite movement may not be negligible.

TABLE 3

Example Doppler shifts of GEO satellites

| Frequency | | 2 GHz | 20 GHz | 30 GHz |
|---|---|---|---|---|
| S2 to S1 | Doppler shift (Hz) | −0.25 | −2.4 | −4.0 |
| S1 to S4 | Doppler shift (Hz) | 2.25 | 22.5 | 34 |
| Not maintained inside the box (with inclination up to 6°) | Doppler shift (Hz) | 300 | 3000 | 4500 |

The Doppler effects become remarkable for MEO and LEO satellites. Table 4 gives example Doppler shifts and rates of NGSO satellites. We can see that the Doppler shifts and rates due to the NGSO satellite movement should be properly considered in the communications system design.

TABLE 4

Doppler shifts and variation rates of NGSO satellites

| Frequency (GHz) | Max Doppler | Relative Doppler | Max Doppler shift variation | |
|---|---|---|---|---|
| 2 | +/−48 kHz | 0.0024% | −544 Hz/s | LEO at |
| 20 | +/−480 kHz | 0.0024% | −5.44 kHz/s | 600 km |
| 30 | +/−720 kHz | 0.0024% | −8.16 kHz/s | altitude |
| 2 | +/−40 kHz | 0.002% | −180 Hz/s | LEO at |
| 20 | +/−400 kHz | 0.002% | −1.8 kHZ/s | 1500 km |
| 30 | +/−600 kHz | 0.002% | −2.7 kHz/s | altitude |
| 2 | +/−15 kHz | 0.00075% | −6 Hz/s | MEO at |

TABLE 4-continued

Doppler shifts and variation rates of NGSO satellites

| Frequency (GHz) | Max Doppler | Relative Doppler | Max Doppler shift variation | |
|---|---|---|---|---|
| 20 | +/−150 kHz | 0.00075% | −60 Hz/s | 10000 km altitude |
| 30 | +/−225 kHz | 0.00075% | −90 Hz/s | |

SUMMARY

Certain aspects of the present disclosure and their embodiments may provide solutions to these or other challenges. There are, proposed herein, various embodiments which address one or more of the issues disclosed herein.

In this disclosure, solutions are proposed to adjust the transmit frequency for LTE and NR UE to compensate for Doppler shifts in satellite networks.

The proposed solutions for random-access procedure and for connected mode consider both the case when a wireless device or UE can perform open-loop frequency offset estimation and the case when the network node, e.g. base station/gNB utilizes implementation-based solutions to estimate the frequency offset.

The proposed methods can help facilitate communications amid large Doppler shifts seen in non-terrestrial networks.

Open-loop and closed-loop approaches are described.
Connected mode and idle mode (random access) solutions are discussed,
Network-assisted frequency adjustment framework for updating Doppler shifts Without using one or more of these solutions, the orthogonality of the subcarriers will be compromised, resulting in severe inter-carrier interference at the receiver. This disclosure contains methods to cope with Doppler shifts seen by UL/DL signals for one or more UEs in a non-terrestrial network. These methods are essential in maintaining the orthogonality of subcarriers in the received signals. Otherwise, communication may be not be feasible due to impairments (such as inter subcarrier interference) resulting from residual Doppler shifts.

According to one aspect a method performed by a wireless device is provided, where the wireless device is operating in a non-terrestrial network, NTN, the NTN comprising at least one network node and a communication satellite, wherein the at least one network node is one of a terrestrial base station and a satellite base station or satellite gateway. The method comprises obtaining a frequency offset corresponding to a Doppler shift of transmission and/or reception frequencies between the wireless device and the network node a non-terrestrial network, NTN, comprising a network node and a communication satellite, wherein the network node is one of a terrestrial base station and a satellite base station or satellite gateway. The method also comprises the frequency offset to an uplink transmission to the network node. In some examples the wireless device obtains the frequency offset by determining it, itself. In other examples the wireless device obtains the frequency offset by receiving an indication corresponding to the frequency offset from a network node.

According to another aspect, a method performed by a network node, the network node operates in a non-terrestrial network, the non-terrestrial network also comprising a communications satellite, wherein the network node is one of a terrestrial base station and a satellite base station or satellite gateway. The method comprises determining a Doppler shift estimate for transmissions between the network node and a wireless device and transmitting a frequency adjustment indication to the wireless device, based on the determined Doppler shift estimate. In some examples the network node determines the Doppler shift based on received UL transmissions, such as reference signals or random access requests. In some examples the network node determines the Doppler shift independently from the served wireless device and in other examples the determination involves receiving an estimate or used offset from the wireless device and transmitting an indication to adjust the currently used offset based on the determination of the Doppler shift.

According to another aspect a wireless device is provided. The wireless device comprises a power supply, memory, and processing circuitry, wherein the processing circuitry is configured to obtain a frequency offset corresponding to a Doppler shift of transmission and or reception frequencies between the wireless device and a non-terrestrial network, NTN, comprising a network node and a communication satellite, wherein the network node is one of a terrestrial base station and a satellite base station or satellite gateway. The processing circuitry is also configured to apply the frequency offset to an uplink transmission to the network node. In some examples the processing circuitry is configured to obtain the frequency offset by determining it, itself. In other examples the processing circuitry is configured to obtain the frequency offset by receiving an indication corresponding to the frequency offset from a network node.

According to another aspect, a network node is provided. The network node comprises a power supply, memory and processing circuitry, wherein the processing circuitry is configured to determine a Doppler shift estimate for transmissions between the network node and a wireless device and the processing circuitry is configured to cause the network node to transmit a frequency adjustment indication to the wireless device, based on the determined Doppler shift estimate. In some examples the network node determines the Doppler shift based on received UL transmissions, such as reference signals or random access requests. In some examples the processing circuitry is configured to determine the Doppler shift independently from the served wireless device and in other examples the processing circuitry is configured to determine the offset through receiving an estimate or used offset from the wireless device and causing the network node to transmit an indication to adjust the currently used offset based on the determined Doppler shift.

According to another aspect a computer program, computer program product or computer readable storage medium is provided, which comprises instructions which when executed on a computer perform any one of the embodiments disclosed herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 17 depicts a UE apparatus in accordance with some embodiments; and

FIG. 18 depicts a UE apparatus in accordance with some embodiments.

DETAILED DESCRIPTION

Figure 1:
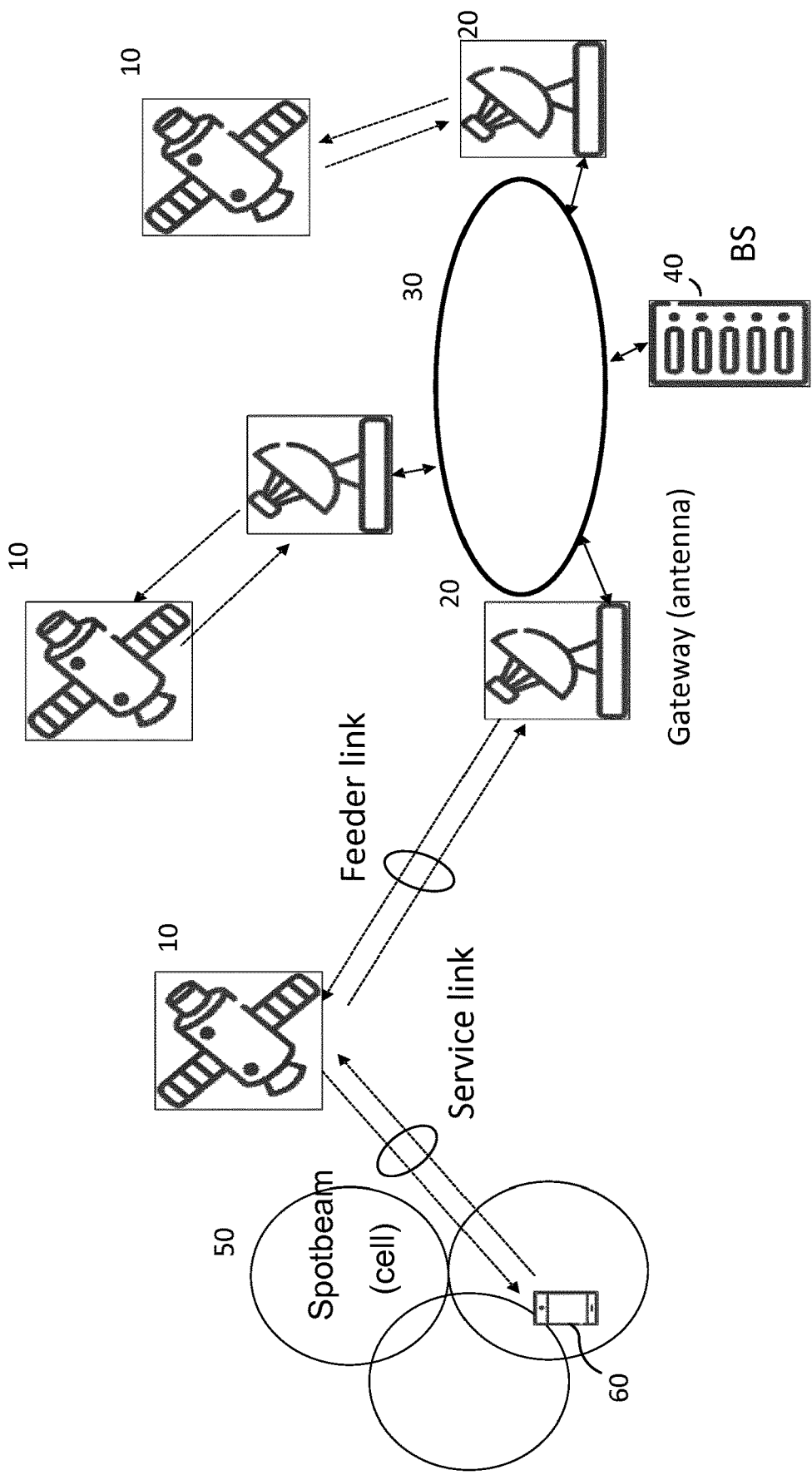
FIG. 1 is an example non-terrestrial network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document provided in the Appendix.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. In particular, a network node may be comprised in a non-terrestrial network as part of a wireless communications system. A non-terrestrial network (NTN) comprises communications satellites and network nodes. The network nodes may be terrestrial or satellite based. For example, the network node may be a satellite gateway or a satellite based base station, e.g. gNB. Other examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In particular the wireless device may be involved in communication with non-terrestrial network nodes, such as communications satellites and satellite based gateways or base stations. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Figure 2A:
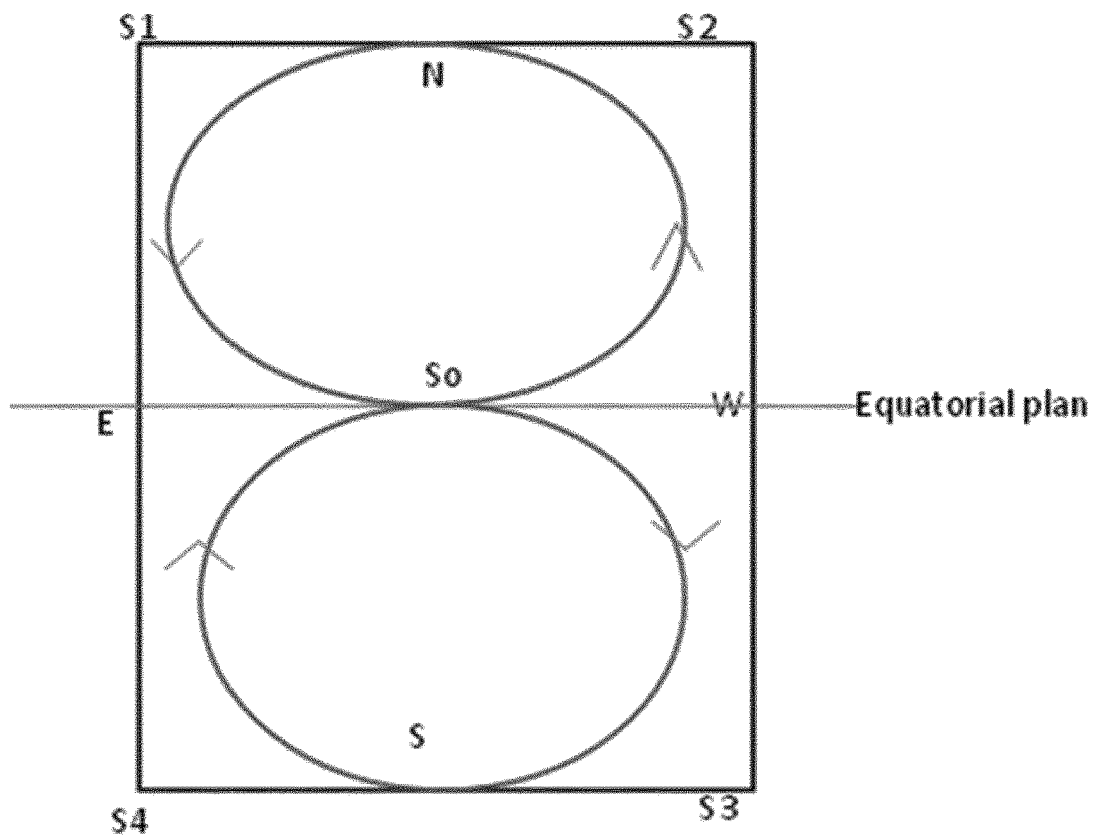
FIG. 2 depicts a trajectory of a GEO satellite.
Figure 2B:
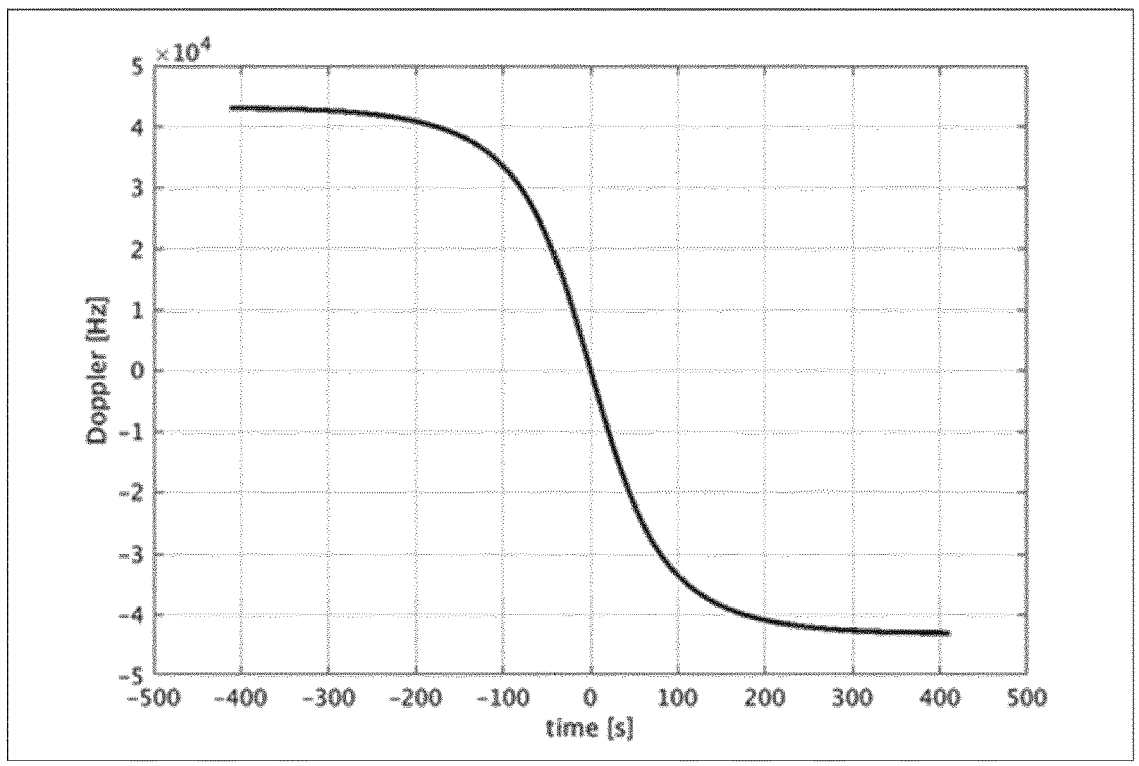

Embodiments disclosed herein consider the problems associated with LEO and MEO satellite based NTN. As described above for GEO satellites, the Doppler effects are small. For LEO and MEO satellites, on the other hand, the Doppler effects can become remarkable. For instance, consider a LEO satellite orbiting at 600 km altitude above the equator and a UE that is stationary on the equator. The velocity of the satellite will be $|\bar{v}_{sat}|$=7562 m/s|. Due to earth rotation, the UE speed will be $|\bar{v}_{ue}|$=464 m/s|. It is assumed that the UE and satellite move in the same direction. The Doppler shift for a 2 GHz carrier—Doppler versus time of LEO satellite passing above UE at 600 km altitude—is shown in FIG. 2b. The maximum Doppler shift in this scenario is 43 kHz or 21 ppm. This is a very substantial frequency error, by far exceeding typical frequency errors in a terrestrial network. In the following, we will use this scenario as an example, bearing in mind that it is not a worst case. E.g., with a lower satellite altitude or higher carrier frequency, the Doppler shift will be larger.

In addition to the Doppler effects on the service link (the link between UE and satellite) described above, the feeder link (the link between the satellite and the gateway) will also be subject to Doppler shifts. Depending on the solution (e.g., bent-pipe or regenerative transponder), these Doppler shifts may also be visible to the UE and RAN. For simplicity the feeder link is not considered in this application but the embodiments disclosed herein are applicable also to Doppler shifts of that link.

Random Access Procedures in LTE and NR

The random-access procedures in LTE and NR are similar. In the existing random-access design, random-access procedures serve multiple purposes such as initial access when establishing a radio link, scheduling request, etc. Among others, an important objective of the random-access procedures is to achieve uplink synchronization, which is important for maintaining the uplink orthogonality in LTE and NR. To preserve the orthogonality of uplink signals from different UEs in an Orthogonal Frequency Division Multiple Access (OFDMA) based system, the time of arrival of each UE's signal needs to be within the cyclic prefix (CP) of the OFDM signal at the base station.

Frequency Adjustment in LTE and NR

An LTE/NR UE utilizes the broadcast synchronization sequences (primary synchronisation signal/secondary synchronisation signal, PSS/SSS) to estimate the DL frequency from a base station. The estimated frequency is used as a reference, based on which it adjusts its local oscillator that determines both DL (receive) and UL (transmit) frequency.

Pre/Post Compensation

To deal with large Doppler shift in LEO/MEO satellite communication systems, pre-compensation (i.e., an offset of the transmission, TX, frequency) can be applied to the signal in the DL such that the DL signal received at a reference point in the spotbeam (e.g., the centre of a spotbeam) appears to have zero Doppler shift from the satellite movement relative to the reference point. With pre-compensation, only residual Doppler shift appears in the DL signal received at the other locations in the spotbeam.

Similarly, post-compensation (i.e., an offset of the reception, RX, frequency) can be applied to the signal in the UL such that the UL signal transmitted from a reference point in the spotbeam (e.g., the centre of a spotbeam) appears zero Doppler shift at the NW side. With post-compensation, only residual Doppler shift appears in the UL signal transmitted from the other locations in the spotbeam.

With pre-compensation in the DL, the carrier frequency the wireless device is locked to after synchronization would be off by the corresponding residual Doppler shift. Such residual Doppler shift in the DL would further translate to the corresponding residual Doppler shift in the UL. With different residual Doppler shifts in the signals from different wireless devices in the UL, the orthogonality of OFDMA/SC-FDMA (single-carrier FDMA) would be significantly impacted.

Due to the large Doppler shifts of signals transmitted from LEO and MEO satellites, the perceived RX frequency of a wireless device can have a substantial frequency offset. This frequency offset can differ greatly between different wireless devices receiving the same signal at different locations in the same cell. Consequently, the wireless devices will transmit with different frequency offsets in the UL. The UL signals will be subject to further Doppler shift due to the relative motion between the satellite and wireless devices. At the satellite, the received signals will therefore have substantially different frequency offsets, which will impact orthogonality.

Figure 3:
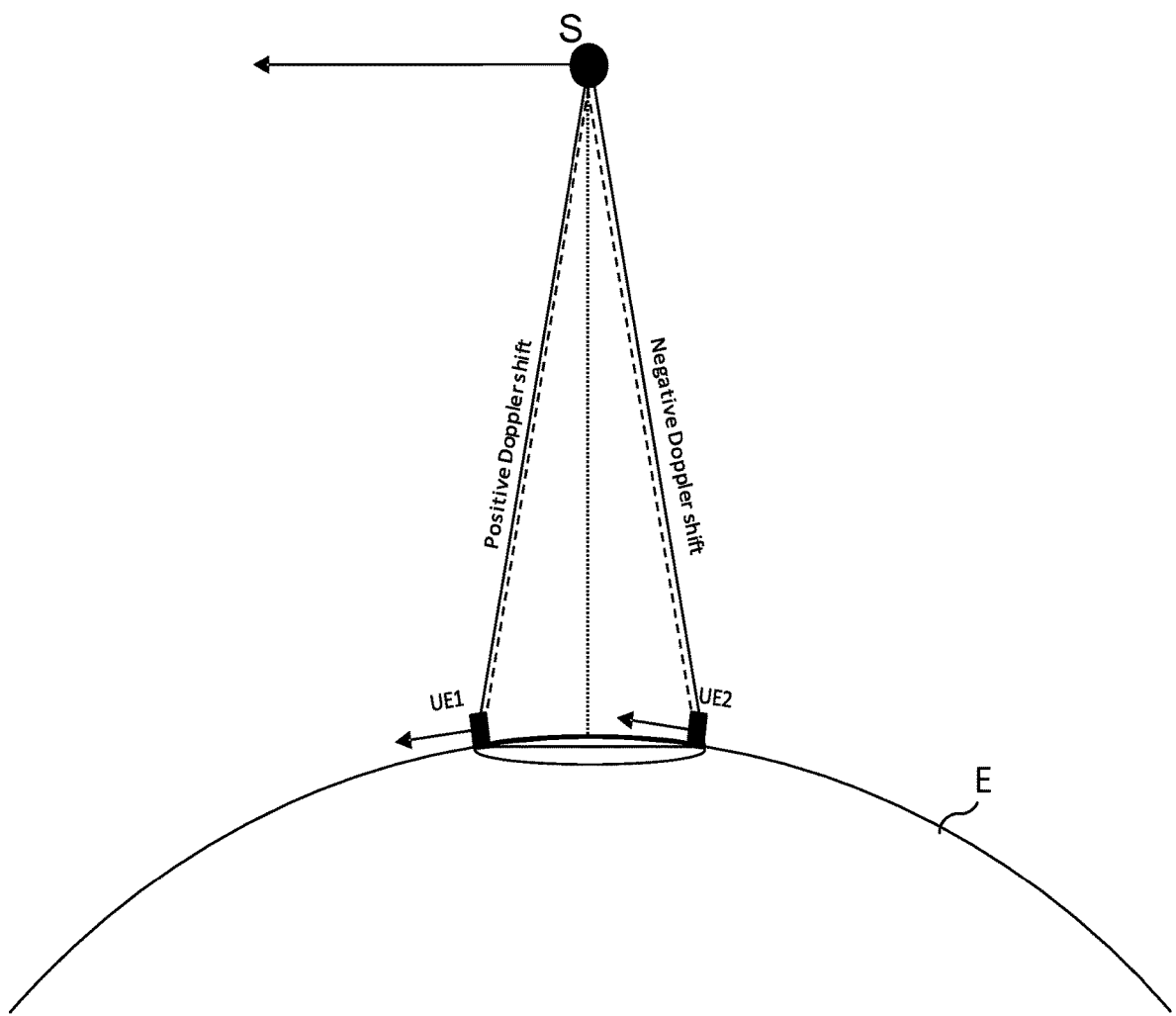
FIG. 3 depicts an example of the Doppler shift problem.

The Doppler shift problem is illustrated in FIG. 3. Two UEs, UE1 and UE2, are served by the same satellite. The satellite S is moving in an orbit around earth E. The UEs are also moving, due to earth rotation and possibly also due to movement relative to the earth surface. Due to the movement of the satellite, the distance between satellite S and UE1 will decrease, resulting in a positive Doppler shift. At the same time, the distance between S and UE2 will increase, resulting in a negative Doppler shift.

Figure 4A:
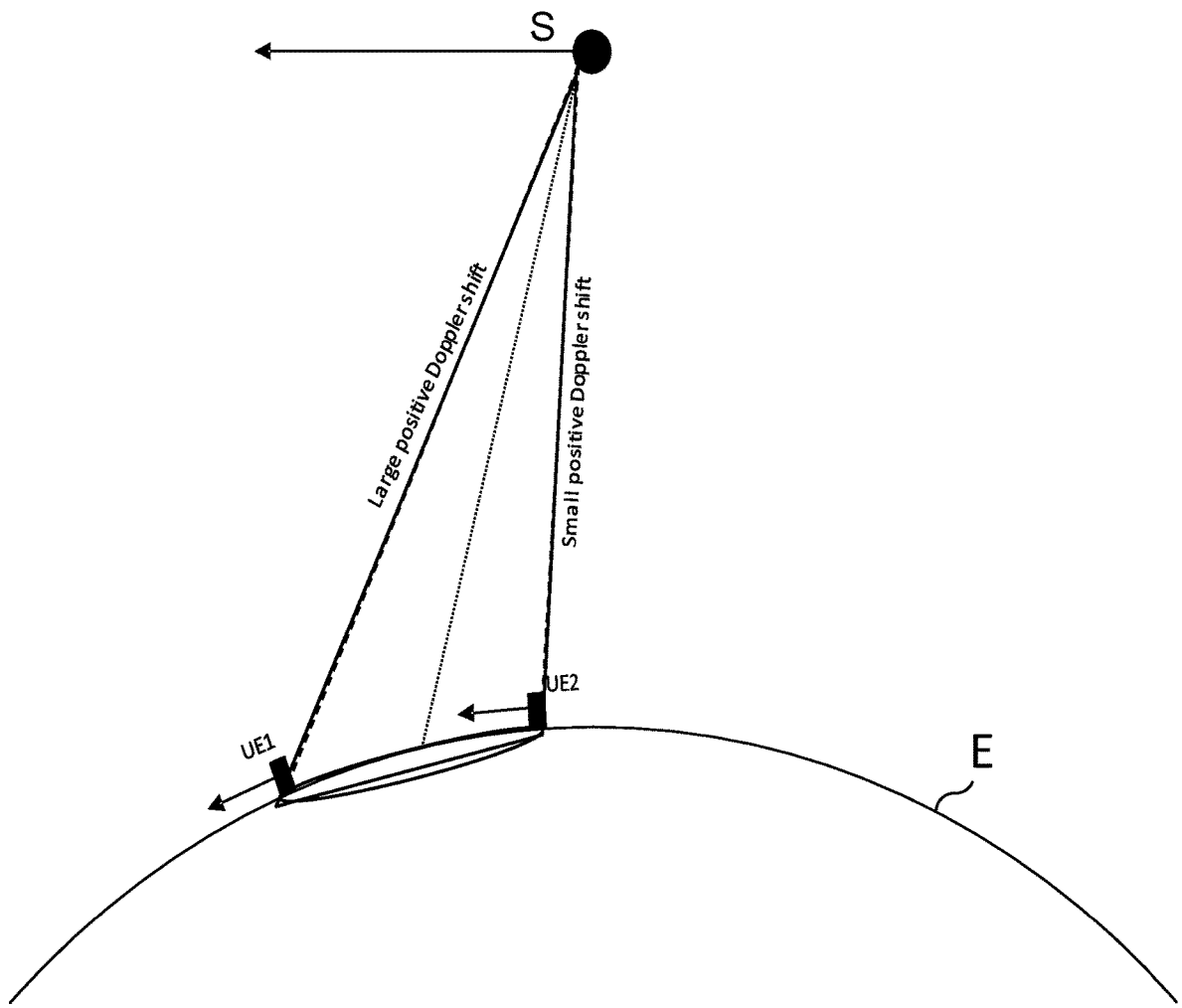
FIG. 4a depicts a further example of the Doppler shift problem.

Another example is shown in FIG. 4a. In this example, the spotbeam is directed towards the forward direction of the satellite. UE1 experiences a large positive Doppler shift while UE2 experiences a small positive Doppler shift. Pre-compensation of the DL TX frequency can be applied in this case such that the received signal e.g. at the centre of the spotbeam appears to have zero Doppler shift. However, UE1 and UE2 will still experience different residual Doppler shifts and the problem remains. The problem with existing solutions is that the received carrier frequency is used as a frequency reference, without taking Doppler shift into account.

Figure 4B:
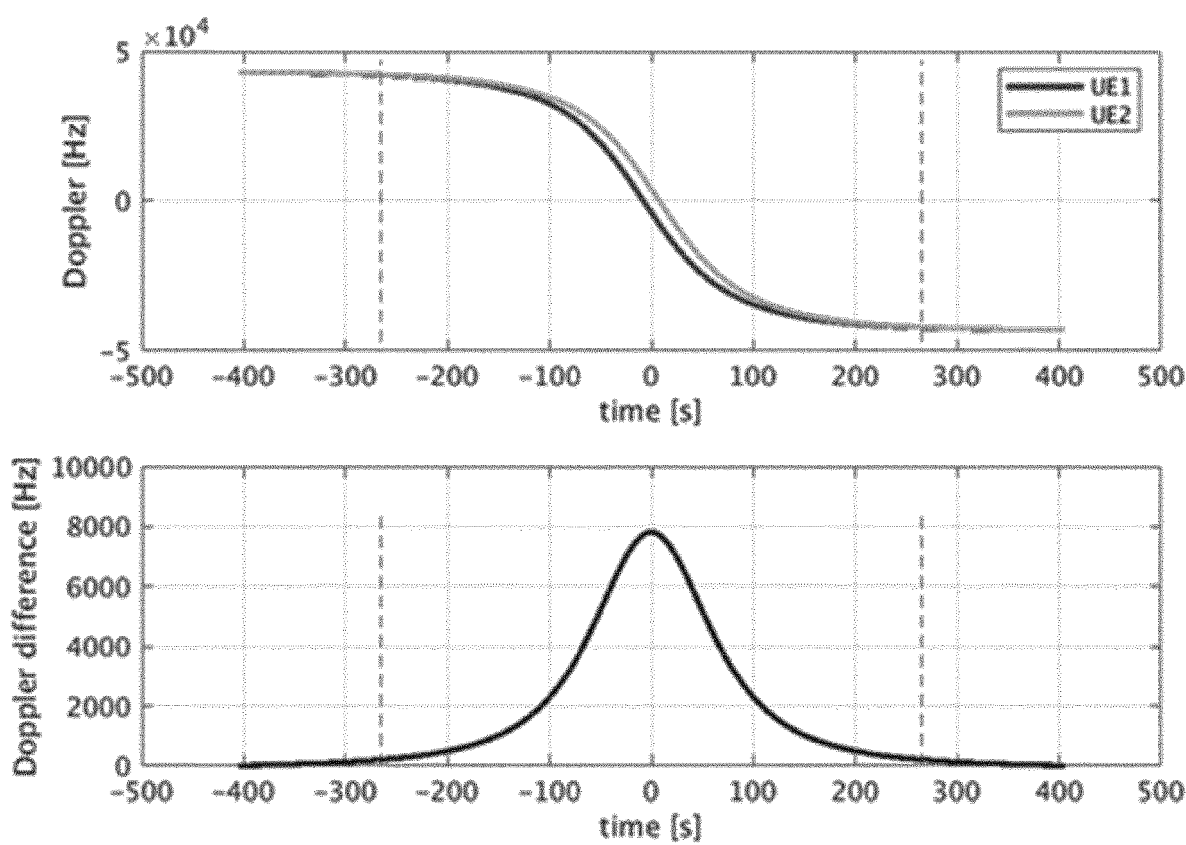
FIG. 4b depicts a further example of the Doppler shift problem.

The difference between these two Doppler shifts is further illustrated in FIG. 4b. Here it is assumed that the spot beam is directed vertically and the UEs are 100 km apart and stationary relative to the earth surface. The upper plot shows the Doppler shifts versus time of the two UEs, while the lower plot shows the Doppler difference between UE1 and UE2. The altitude is again assumed to be 600 km and the carrier frequency 2 GHz.

Initial Synchronisation

In order to access the 5G network, a UE has to acquire time and frequency synchronization using PSS/SSS. As shown above UEs in the same cell may tune to significantly different frequencies due to Doppler shifts, even if pre-compensation is used. And since the frequency of the DL signal is typically the only time/frequency reference a UE has, the DL Doppler shift will translate to a corresponding shift in the UL. In addition, the UL signals will also be subject to Doppler shifts.

Figure 5A:
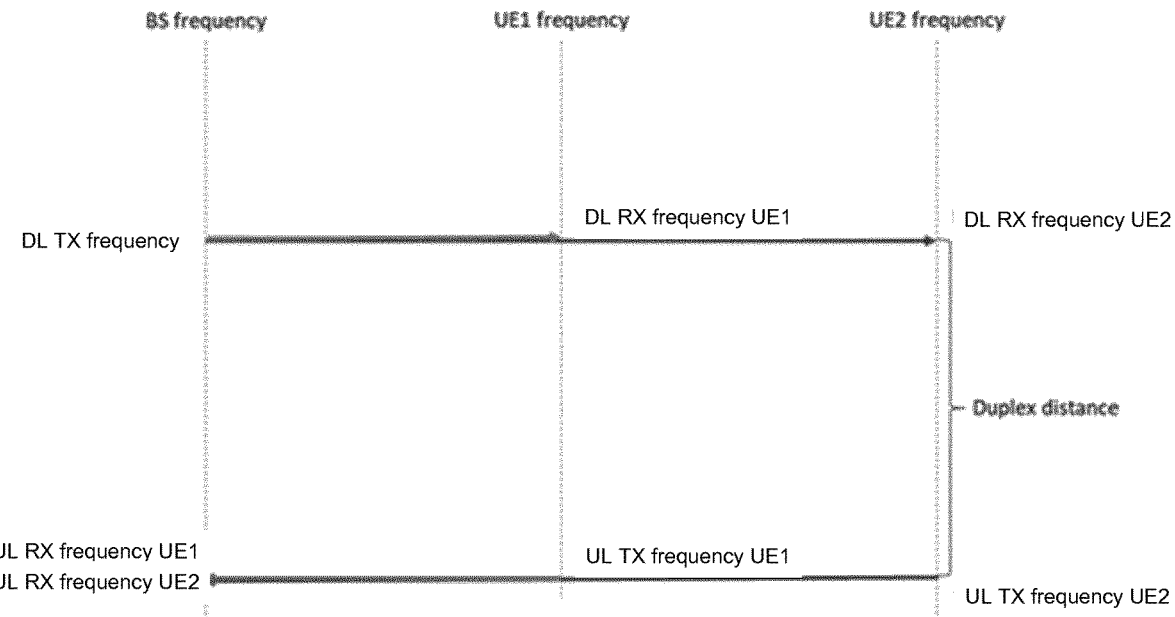
FIG. 5a illustrates frequency aligned uplink transmissions from two UEs in absence of Doppler shifts.
Figure 5B:
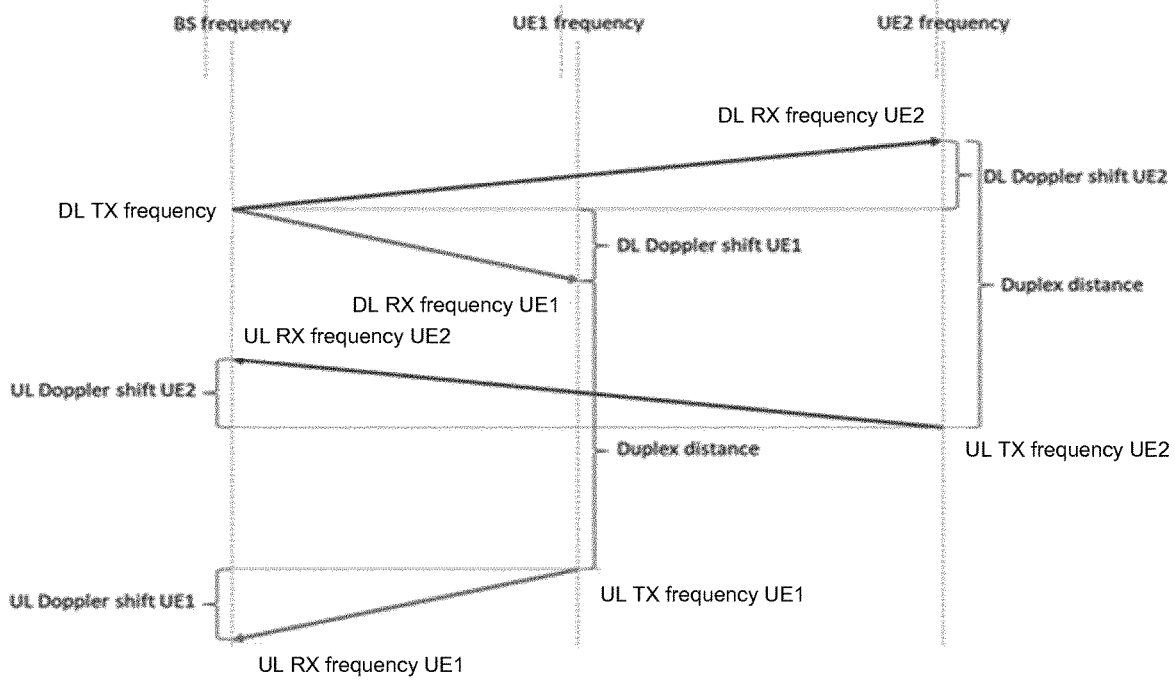
FIG. 5b illustrates frequency misaligned uplink transmissions from two UEs in presence of Doppler shifts.

This is illustrated in FIG. 5a and FIG. 5b. In FIG. 5a, there is no Doppler shift and the UL transmissions of the two UE are frequency aligned, while in FIG. 5b, one UE experiences positive Doppler shift and one UE negative Doppler shift. Their uplinks are transmitted at frequencies misaligned by the (residual) DL Doppler shift difference shown in FIG. 4b, and received at frequencies further misaligned by a (residual) UL Doppler shift difference. Assuming the Doppler difference magnitude in the example shown in FIG. 4b in both UL and DL, the total received UL frequency difference between the two UE will be up to approximately 16 kHz. By this, the orthogonality of OFDMA/SC-FDMA would be significantly impacted.

The embodiments below deal with how to adjust UL carrier frequency so that the orthogonality of OFDMA/SC-FDMA in the UL is maintained.

If pre/post-compensations are used, the Doppler shift referred in the embodiments below refer to residual Doppler shift If compensations are not used, the Doppler shift referred to in the embodiments below refer to actual Doppler shift.

Doppler shifts can be calculated if the positions and velocities of the satellite and UE are known. Therefore, prior to initial access, the UE may estimate the DL and UL Doppler. The UE can adjust its UL TX frequency by the sum of the estimated UL and DL Doppler shifts (in opposite direction of the Doppler shift) when sending Msg1.

If estimation of Doppler shift prior to initial access is not possible, closed-loop frequency compensation during initial access may be necessary. After UE transmits Msg1, the NW may estimate the frequency offset in Msg1 and sends back a frequency adjustment command for example in Msg2. The UE then adjusts its frequency based on the command in Msg2 before sending Msg3.

Figure 5C:
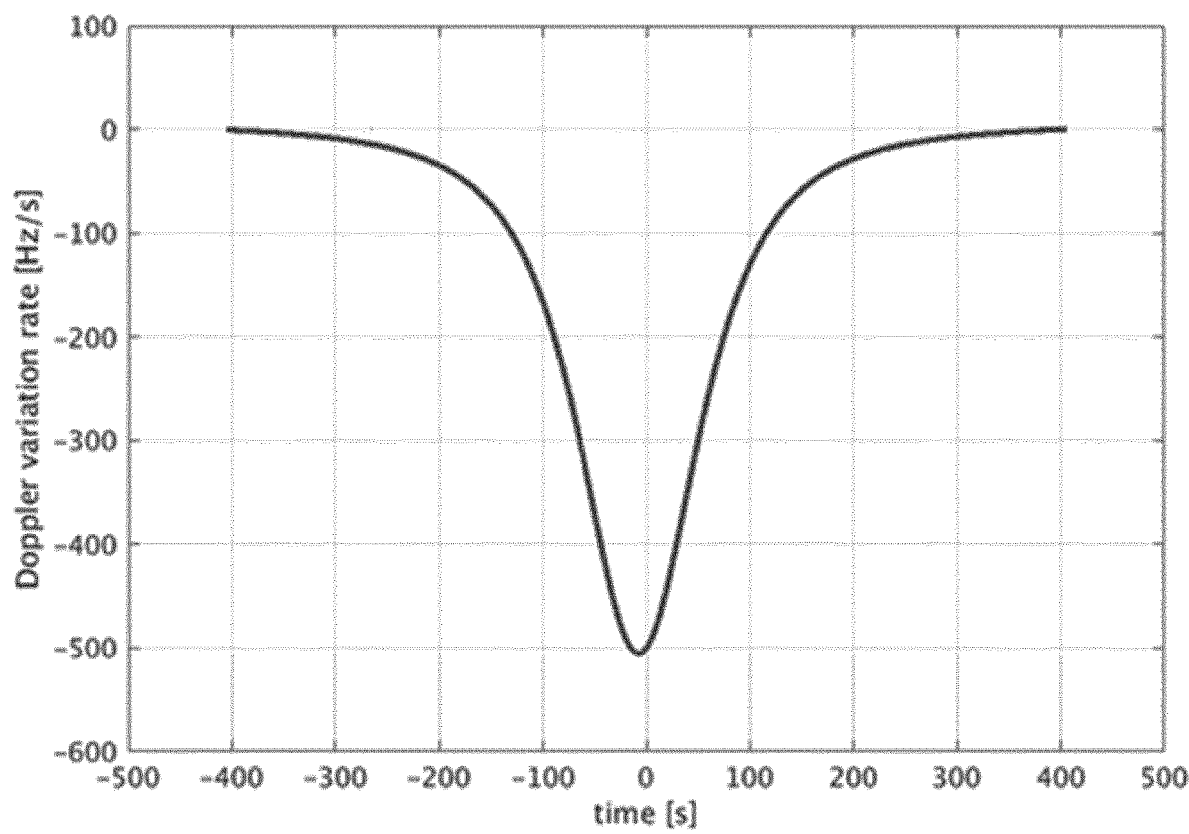
FIG. 5c illustrates Doppler variation rate.

As the satellite passes above the UE, the Doppler can vary at a high rate. Returning to the example scenario, the DL Doppler variation rate is shown in FIG. 5c. This indicates that it may be necessary to track the UL frequency offset also in connected mode, and when necessary send frequency adjustments commands to the UE. UE could also track the variations in the received DL frequency. Once the local oscillator of the UE is locked to the DL frequency prior to initial access, it will drift only slowly. Since this drift is typically slower than the Doppler variation rate shown in FIG. 5c, the UE could detect variations, assume they were due to changes in DL Doppler shift, and adjust its UL TX frequency accordingly.

In one embodiment the wireless device or UE performs a Doppler shift estimate. In some examples the wireless device applies a transmission (TX) frequency offset to compensate for the Doppler shift before sending a random access request, e.g. Msg1. The network node, e.g. base station (BS) sends back a closed-loop frequency adjustment indication or command in a random access response, e.g. Msg2. The wireless device adjusts its frequency based on the command in Msg2 before sending Msg3 to the BS. wireless device may include its Doppler shift estimate in a further UL transmission, e.g. Msg3.

Figure 5D:
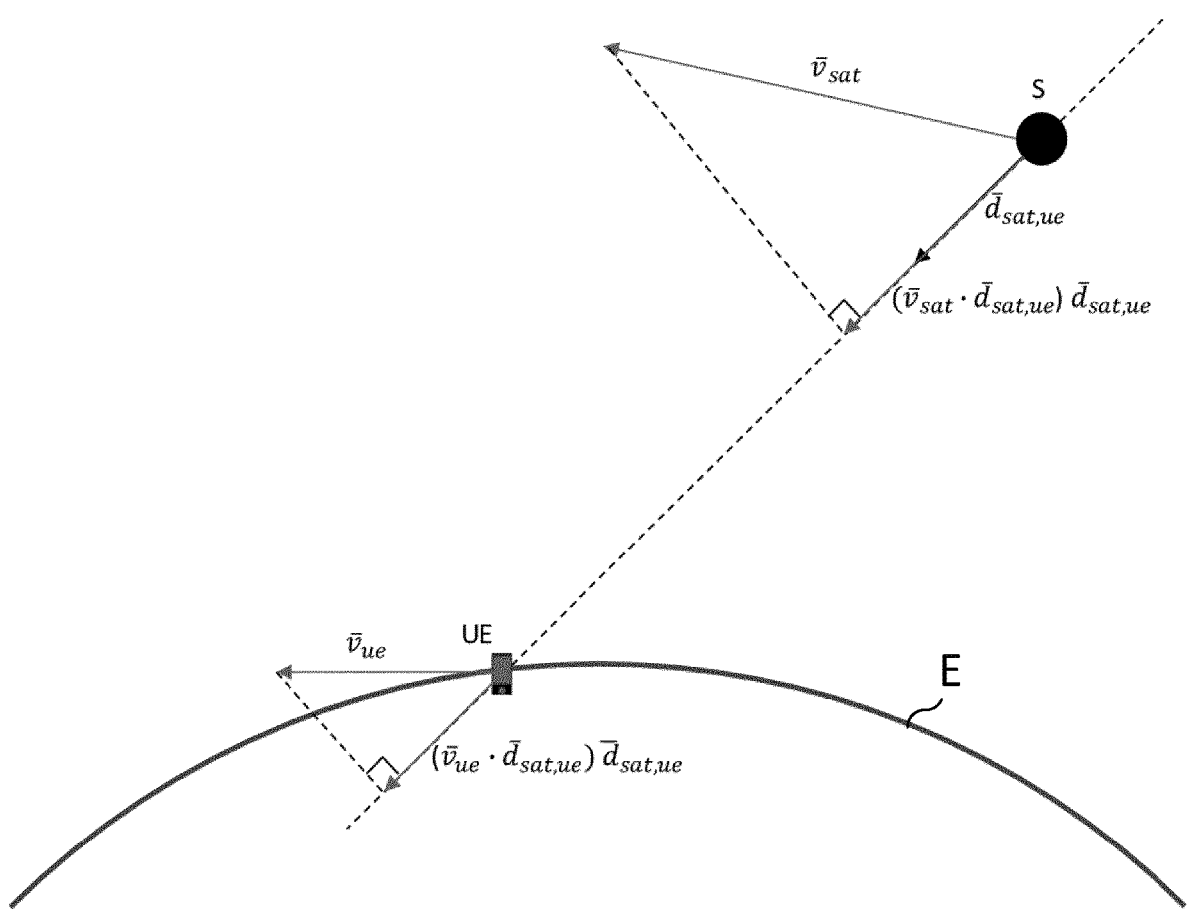
FIG. 5d depicts the Doppler shift dependency on the satellite and UE velocities'.

The Doppler shift estimate may be based on knowledge of the position and velocity of the satellite and the wireless device. An illustration of how the Doppler shift depends on the satellite and UE velocities' projections onto the line connecting the satellite and UE are depicted in FIG. 5d.

When pre/post-compensation is used, the Doppler shift to be determined or estimated is the residual Doppler shift, the estimate of which also requires the knowledge of the reference point to which the pre/post-compensation is applied. In some examples the satellite position and velocity are predicted by the wireless device based on prior knowledge of the satellite's trajectory. In some examples the satellite position and velocity is broadcast from the satellite. The reference point to which the pre/post-compensation is applied may be broadcast as part of the system information. The position and velocity of the wireless device may be derived using a Global Navigation Satellite System (GNSS) e.g. Global Positioning System (GPS). The position of the wireless device may also be derived using other positioning techniques applied to the NTN communication satellites. For example, TDOA (time difference of arrival) of the downlink signals of multiple satellites when sufficient number of satellite signals of acceptable quality are available to allow position estimation. Another method may include estimated Doppler shift differences of the downlink signals of multiple satellites.

The Doppler shift of a signal can be derived using the formula:

$$f_d = \frac{f_c}{c}(\bar{v}_{sat} - \bar{v}_{ue}) \cdot \bar{d}_{sat,ue} \qquad \text{Equation 1}$$

where $f_c$ is the carrier frequency, c is the speed of light, $\bar{v}_{sat}$ is the velocity vector of the satellite, $\bar{v}_{ue}$ is the velocity vector of the wireless device, $\bar{d}_{sat,ue} = (\bar{x}_{ue} - \bar{x}_{sat})/\|\bar{x}_{ue} - \bar{x}_{sat}\|$ is a unit length vector directed from the satellite position $\bar{x}_{sat}$ towards the wireless device position $\bar{x}_{ue}$, and · denotes dot product.

The UL and DL carrier frequencies may be assumed to be sufficiently similar that the Doppler frequency shifts on UL and DL can be approximated to be the same. In such an example the wireless device may apply a frequency offset that is $-2f_d$ relative to the nominal UL TX frequency to compensate for Doppler shift in both DL (the frequency offset in the received frequency reference) and UL (the frequency offset in the signal from the wireless device to the BS). In such an example, the nominal UL TX frequency refers to the UL TX frequency the wireless device has derived based on the frequency reference achieved from the received DL signal.

Taking into account that the UL carrier frequency $f_{c,UL}$ and DL carrier frequency $f_{c,DL}$ are different, the wireless device may apply a frequency offset that is $-(f_{d,DL}+f_{d,UL})$ relative to the nominal UL TX frequency to compensate for Doppler shift in both DL (the frequency offset in the received frequency reference) and UL (the frequency offset in the signal from the wireless device to the BS). Here, $$f_{d,DL} = \frac{f_{c,DL}}{c}(\bar{v}_{sat} - \bar{v}_{ue}) \cdot \bar{d}_{sat,ue} \text{ and } f_{d,UL} = \frac{f_{c,UL}}{c}(\bar{v}_{sat} - \bar{v}_{ue}) \cdot \bar{d}_{sat,ue}$$

and nominal UL TX frequency refers to the UL TX frequency the wireless device has derived based on the frequency reference achieved from the received DL signal.

In another embodiment the network node (e.g. BS) estimates the Doppler shift. For example, during random access attempt (MSG1) by the wireless device. The network node sends a frequency adjustment command in a random access response (MSG2), which the wireless device uses in subsequent UL transmissions (MSG3). In one example the network node takes into account the potentially large frequency offsets of each of a plurality of random access requests (MSG1) each transmitted from different wireless devices by introducing frequency guard bands around the existing physical random access channel (PRACH) resources. The network scans the PRACH resources and guard bands for the random access requests (MSG1) using different hypothetical frequency offsets. In another example the network node may manage the Doppler shift, e.g, performs a Doppler shift estimate, during connected mode. In one example the network node sends a frequency adjustment command to a served wireless device. wireless device applies TX frequency offset following the command from BS in subsequent transmissions to the BS. The Doppler shift estimate may be based on frequency offset estimations on a signal transmitted from the wireless device to the BS, e.g. physical uplink control channel (PUCCH) or physical uplink shared channel (PUSCH) or UL reference signals. In some examples the frequency adjustment command may indicate a relative increase or decrease of the used uplink frequency. It may also or alternatively indicate an absolute frequency offset relative to the nominal transmit frequency. In some examples the wireless device may be radio resource control (RRC) configured to apply one of the aforementioned options. In some examples the wireless device may report its currently used frequency offset to the BS in an uplink message. The frequency adjustment command may be sent to the wireless device through RRC signaling. In another example, the frequency adjustment command is sent to the wireless device in a Medium Access Control (MAC) control element (CE) or a downlink control information (DCI). wireless device may be RRC configured to interpret the MAC CE or DCI bits as certain offset values to, for example, apply the absolute UL frequency or the frequency is relative to a nominal transmit frequency.

In some examples the network node predicts the satellite's trajectory. This may be an ongoing process before serving a given wireless device through a random access (RA) procedure. The network node may calculate the anticipated variation in Doppler shift and send a frequency adjustment command to the wireless device when necessary. I.e. dynamically, during connected mode. In some examples the predicted trajectory information may be broadcast, e.g. in system information. In one example, the network node determines a configurable time value which is indicated to the wireless device. A Doppler shift value is valid for the duration of the time indicated. When the timer expires, the wireless device needs to obtain an updated Doppler shift using one or more of the methods disclosed herein and/or in other embodiments. In another example a time value describing how long the wireless device may assume a Doppler shift is valid is defined and indicated to the wireless device, e.g. in RRC configuration. wireless device derives the new Doppler shift periodically using the time value to determine the periodicity.

The wireless device may be RRC configured with a set of time values and, for example, MAC CE may be used to select which time value the wireless device should apply. In some examples the update of new Doppler shift may be triggered by defining a field in a DCI such that when wireless device receives the DCI with such field set to "on", the wireless device derives the new Doppler shift.

The wireless devices served by the same satellite may have different Doppler shifts. The network may apply a frequency pre-compensation for the portion of the Doppler shift common to all wireless devices in the same spotbeam/ cell. For example, the network may broadcast the applied spotbeam/cell-specific frequency pre-compensation in the respective spotbeam/cell system information. The wireless device may then take the indicated frequency pre-compensation into account when calculating its compensation of UL TX frequency as described in any of the embodiments herein. In another example the network node indicates to the wireless devices in the spotbeam footprint (cell) the maximum Doppler differential for the cell. For example, due to relative motion between a satellite and a ground station, it is possible that the feeder link (therefore the overall path length from ground station to wireless device) changes but the service link remains the same. Since this change is common to all wireless devices served by the satellite, the network may apply a common frequency pre-compensation before transmission or indicate to the wireless device's about the change.

When a wireless device detects a change in the received DL frequency this may be due to a change in the DL Doppler shift. The wireless device may be configured to assume that this is due to a change in the DL Doppler shift adjust its UL frequency accordingly. The network may signal to the wireless device a parameter value indicating a certain frequency drift the wireless device should tolerate without adjusting its UL frequency. If the wireless device detects a change in the received DL frequency such that the rate of change exceeds this parameter, the wireless device can then treat this as being due to a change in the DL Doppler. The wireless device adjusts its UL frequency accordingly. This parameter value can be signaled via DCI, MAC or RRC. In another example, the network may signal a range of frequency drift values (e.g. defined by a maximum value and a minimum value) to the wireless device. If the wireless device detects a change in the received DL frequency such that the rate of change falls within the indicated range, the wireless device treats this as being due to a change in the DL Doppler. The wireless device adjusts its UL frequency accordingly. Again, these parameter values can be signaled via DCI, MAC or RRC. For example, the wireless device uses a local oscillator with sufficient stability as a frequency reference. After the local oscillator has been tuned to the received DL frequency, it will experience a small internal frequency drift. E.g., an oscillator frequency drift of 0.01 ppm/s may be feasible, corresponding to 20 Hz/s at 2 GHz carrier frequency. Perceived changes in received DL frequency that are significantly faster than that can be assumed to be due to changes in Doppler shift. For a LEO satellite orbiting 600 km above earth, the Doppler variation rate may be up to 500 Hz/s.

Assuming that the UL and DL carrier frequencies are sufficiently similar that the Doppler frequency shifts on UL and DL can be approximated to be the same, the wireless device may measure a change $\Delta f$ in DL frequency, and adjust its applied UL frequency offset by $-2\Delta f$ to compensate for the change in Doppler shift in both DL (the offset in the received frequency reference) and UL (the frequency offset in the signal from the wireless device to the BS).

In another example, taking into account that the UL carrier frequency $f_{c,UL}$ and DL carrier frequency $f_{c,DL}$ are different, if the wireless device measures a change $\Delta f$ in DL frequency, it adjusts its applied UL frequency offset by $-\Delta f(1+f_{c,UL}/f_{c,DL})$ to compensate for the change in Doppler shift in both DL (the frequency offset in the received frequency reference) and UL (the frequency offset in the signal from the wireless device to the BS).

The wireless device may report its currently used frequency offset to the BS in an uplink message.

The abovementioned examples will be further described in relation to one or more of the figures.

Figure 6:
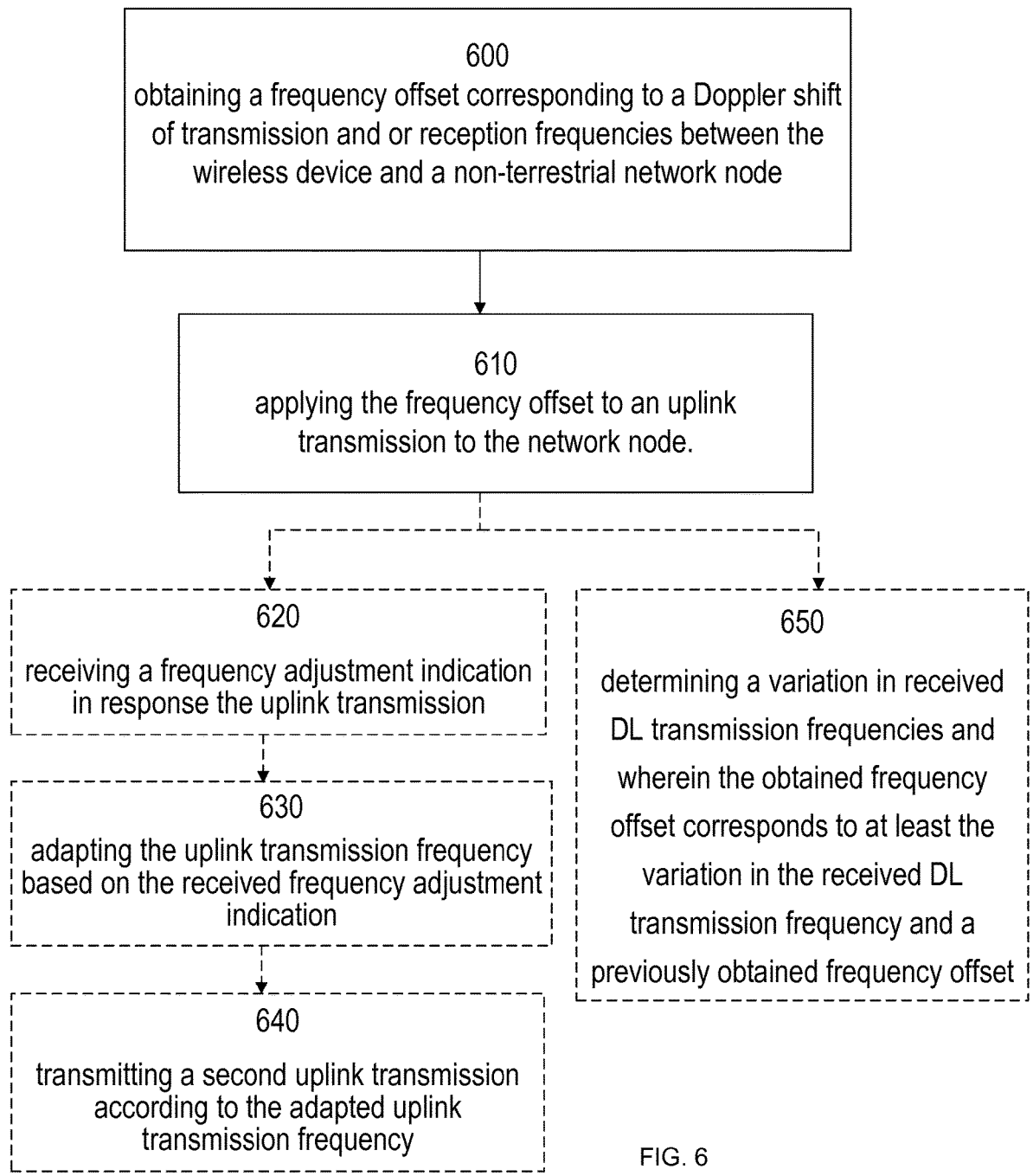
FIG. 6 is a flowchart of an example embodiment according to the present disclosure.

In FIG. 6 a method performed by a wireless device is depicted. The wireless device is suitable for operating in a non-terrestrial network, NTN, the NTN comprising at least one network node and a communication satellite, wherein the at least one network node is one of a terrestrial base station and a satellite base station or satellite gateway. The method begins a 600 with the wireless device obtaining a frequency offset corresponding to a Doppler shift of transmission and/or reception frequencies between the wireless device and a non-terrestrial network, NTN, node. The NTN network node may be a terrestrial base station, a satellite base station or satellite gateway. The method proceeds at step 610 with the wireless device applying the frequency offset to an uplink transmission to the network node. The wireless device may obtain the frequency offset corresponding to the Doppler shift in a number of ways. For example, the frequency offset may be received by the wireless device from the network node.

In another example the frequency offset is obtained by receiving a frequency adjustment indication from the network node, wherein the frequency adjustment indication corresponds to a differential between the common portion and the Doppler shift at a location of the UE. In another example frequency offset is obtained by wireless device estimating the Doppler shift based on at least one of a position of a communication satellite via which the wireless device communicates with the network node; a velocity of the satellite; a position of the wireless device, and a velocity of the wireless device. In some examples the position and/or velocity are determined using one or more of a global navigation satellite system, GNSS; global positioning system, GPS; time difference of arrival, TDOA; and estimated Doppler shift differences of downlink signals of two or more satellites. In some examples of the method the uplink transmission is part of an initial access procedure. The method may optionally include the applied frequency offset transmitted to the network node. In one embodiment the uplink transmission at step 610 is a first uplink transmission, the method continues with step 620 with the wireless device receiving a frequency adjustment indication in response the uplink transmission. At step 630 the method involves the wireless device adapting the uplink transmission frequency based on the received frequency adjustment indication and proceeds with step 640 with the wireless device transmitting a second uplink transmission according to the adapted uplink transmission frequency. In some examples the first uplink transmission is a Msg1 in a random access procedure, the received response is a Msg 2 in the random access procedure and the second uplink transmission is a Msg3 in the random access procedure. In some embodiments the frequency adjustment indication comprises one of a relative increase or decrease of the used uplink frequency and an absolute frequency offset relative to the nominal transmit frequency.

In some embodiments the method further includes receiving a broadcast indication of common portion of a Doppler shift, common to a plurality of wireless devices in a spot-beam footprint.

In some embodiments the frequency offset corresponds to a residual Doppler shift, wherein the residual Doppler shift is the difference in frequency between the actual Doppler shift and a pre-compensation or post-compensation to the actual Doppler shift for the wireless device. In some further examples of the embodiment the pre-compensation comprises a frequency offset being applied to a DL transmission received by the wireless device such that the Doppler shift at a reference point in a spot beam footprint is zero and the post-compensation comprises a frequency offset to be applied to an UL transmission such that the Doppler shift at a reference point in a spot beam is zero and the residual Doppler shift corresponds to the difference between said reference point and the location of the wireless device. The frequency offset may be obtained by estimating the Doppler shift based at least on the reference point location.

In some examples the method may include the Doppler shift is derived according to:

$$f_d = \frac{f_c}{c}(\bar{v}_{sat} - \bar{v}_{ue}) \cdot \bar{d}_{sat,ue}$$

wherein, $f_c$ is the carrier frequency, c is the speed of light, $\bar{v}_{sat}$ is the velocity vector of the satellite, $\bar{v}_{ue}$ is the velocity vector of the UE, $\bar{d}_{sat,ue}=(\bar{x}_{ue}-\bar{x}_{sat})/\|\bar{x}_{ue}-\bar{x}_{sat}\|$ is a unit length vector directed from the satellite position $\bar{x}_{sat}$ towards the UE position $\bar{x}_{ue}$, and · denotes dot product.

In some examples the method may include the frequency offset is determined as:
- $-2f_d$, relative to a nominal uplink, UL, transmission frequency to compensate for a Doppler shift in both downlink, DL, (the frequency offset in a received frequency reference) and UL (a frequency offset in a transmission from the wireless device to the network node), wherein nominal UL transmission frequency refers to an UL transmission frequency the wireless device has derived based on the frequency reference obtained from the received DL signal.

In some examples the method may include the frequency offset is determined as:

−($f_{d,DL}$+$f_{d,UL}$) relative to a nominal uplink, UL, transmission frequency to compensate for Doppler shift in both downlink, DL, (the frequency offset in a received frequency reference) and UL (the frequency offset in the transmission from the UE to the network node), wherein $$f_{d,DL} = \frac{f_{c,DL}}{c}(\overline{v}_{sat} - \overline{v}_{ue}) \cdot \overline{d}_{sat,ue} \text{ and } f_{d,UL} = \frac{f_{c,UL}}{c}(\overline{v}_{sat} - \overline{v}_{ue}).$$

$\overline{d}_{sat,ue}$ and nominal UL transmission frequency refers to the UL transmission frequency the UE has derived based on the frequency reference obtained from the received DL signal.

In one further embodiment, the method proceeds from step 610 with step 650 and the wireless device determining a variation in received DL transmission frequencies, wherein the obtained frequency offset corresponds to at least the variation in the received DL transmission frequency and a previously obtained frequency offset. In some examples the wireless device determines the variation by receiving an indication from the network node corresponding to a variation in Doppler shift over time. In some examples the indication from the network node corresponding to a variation in Doppler shift over time comprises one or more of: a further frequency adjustment indication; a time for which the frequency adjustment indication is valid; configuring the wireless device with a plurality of frequency adjustments/offsets and durations for which each offset is valid. In some examples the wireless device receives a parameter value corresponding to a Doppler frequency variation, wherein the obtained frequency offset corresponds to at least the variation in the received DL transmission frequency and a previously obtained frequency offset when the determined variation in the received DL transmission frequency exceeds the parameter value. The parameter value may comprise a range of values.

In any of the above described methods the indications from the network node may be received in a field of a downlink control information, DCI.

Figure 7:
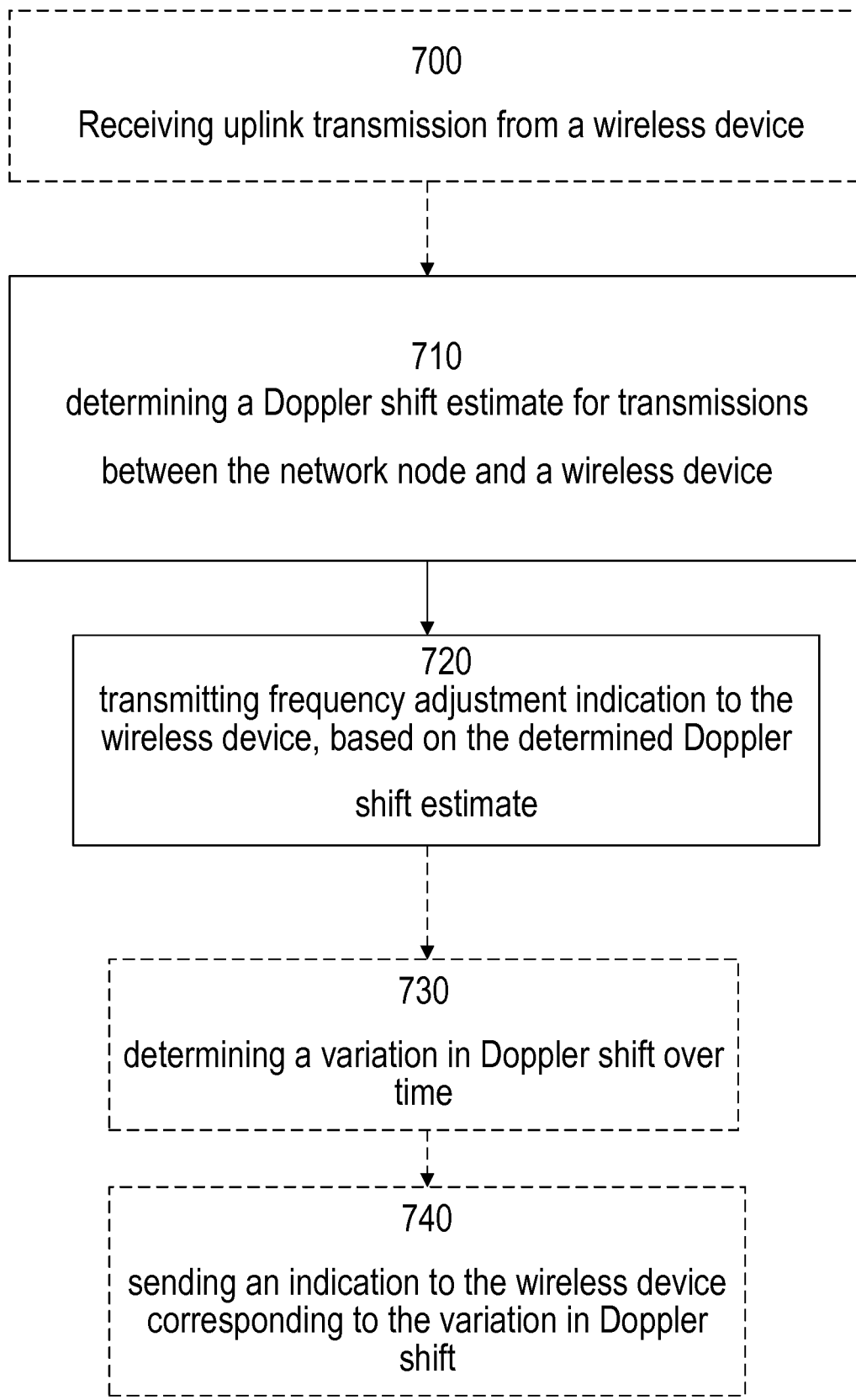
FIG. 7 is a flowchart of an example embodiment according to the present disclosure.

FIG. 7 depicts a method performed by a network node. The network node is comprised in a non-terrestrial network, the non-terrestrial network comprising at least one network node, and a communications satellite. The network node may be a terrestrial base station, a satellite base station or satellite gateway. The method starts at step 710 with the network node determining a Doppler shift estimate for transmissions between the network node and a wireless device. The method proceeds at step 720 with the network node transmitting a frequency adjustment indication to the wireless device, based on the determined Doppler shift estimate. The network node may determine the Doppler shift estimate in a number of ways. In one embodiment the network node receives at step 700 an UL transmission from the wireless device and then determines the Doppler shift estimate based on the received UL transmission. The UL transmission may comprise a signal, for example, a physical uplink control channel signal, a physical uplink shared channel signal or an uplink reference signal. In some examples the UL transmission is an initial access transmission and the network node determines the Doppler shift estimate based on a random access message received from the wireless device and the frequency adjustment indication is transmitted to the wireless device in a random access response message. In some examples the received random access request contains an estimated (used) frequency offset as determined by the wireless device. The network node may adjust this offset based on its own computations, for example through receiving a plurality of other UL transmissions from the same spot beam footprint and/or knowledge of the wireless device location in the spot beam. The network node may then provide the frequency adjustment in relation to the indicated used frequency offset received from the wireless device. In other examples the frequency adjustment indication may be sent in one of: a radio resource control message, a medium access control message, a downlink control information message. In some examples of the method, the frequency adjustment indication comprises one of a relative increase or decrease of the used uplink frequency and an absolute frequency offset relative to the nominal transmit frequency. The method may optional involve the network node applying guard bands between physical random access channel resources and scanning for random access requests from wireless devices, wherein the network node applies varying Doppler shift estimations to detect a random access request from the wireless device.

In another option of the method, the method proceeds with step 730 with the network node determining a variation in Doppler shift over time. The method may then proceed at step 740 with the network node sending an indication to the wireless device corresponding to the variation in Doppler shift. The variation in Doppler shift over time may comprises predicting a trajectory of the communication satellite. In some examples the indication from the network node corresponding to a variation in Doppler shift over time comprises the network node sending a further frequency adjustment indication, for example in a command to trigger the wireless device to adjust its frequency dynamically. In other examples the indication comprises a time for which the frequency adjustment indication is valid such the wireless device must trigger a new estimate when the indicated time has expired. In other examples the network node configures the wireless device with a plurality of frequency adjustments/offsets and durations for which each offset is valid. In this way the wireless device adapts to the next predicted offset based on the time. In some examples a combination of one or more of the above methods may be used.

In some embodiments of the method, the Doppler shift estimate comprises a portion common to a plurality of UEs in a spotbeam footprint the method further comprising broadcasting an indication corresponding to the common portion of the Doppler shift and wherein the transmitted frequency adjustment indication corresponds to a differential between the common portion and the Doppler shift at a location of the wireless device.

In other embodiments the Doppler shift estimate comprises a portion common to a plurality of UEs in a spotbeam footprint and the method further comprises broadcasting an indication corresponding to the common portion of the Doppler shift wherein the transmitted frequency adjustment indication corresponds to a differential between the common portion and the Doppler shift at a location of the wireless device.

Figure 8:
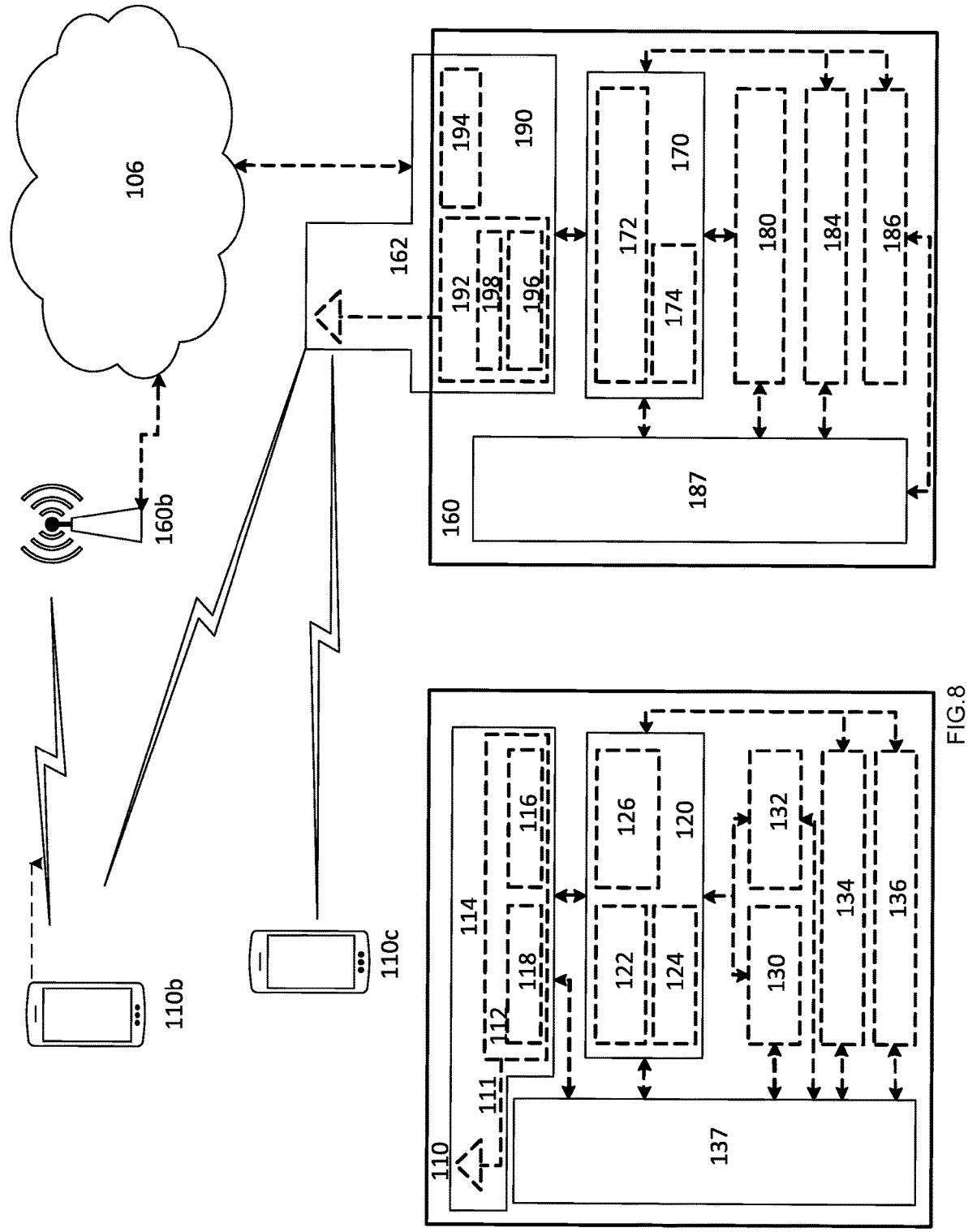
FIG. 8 illustrates an example of a wireless network, in accordance with some embodiments.

Although the subject matter described herein may be implemented in any appropriate type of system using any suitable components, the embodiments disclosed herein are further described in relation to a wireless network, such as the example wireless network illustrated in FIG. 8. For simplicity, the wireless network of FIG. 8 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

In FIG. 8, network node 160 includes processing circuitry 170, device readable medium 180, interface 190, auxiliary equipment 184, power source 186, power circuitry 187, and antenna 162. As previously described, the network node is connectable to a non-terrestrial network as depicted, for example in FIG. 1. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. For example, the processing circuitry 170 may be configured to determining a Doppler shift estimate for transmissions between the network node and a wireless device. The processing circuitry may then be configured to transmit a frequency adjustment indication to the wireless device, based on the determined Doppler shift estimate. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. For example, processing circuitry 120 may be configured to obtain a frequency offset corresponding to a Doppler shift of transmission and or reception frequencies between the wireless device and a non-terrestrial network, NTN, comprising a network node and a communication satellite, wherein the network node is one of a terrestrial base station and a satellite base station or satellite gateway. The processing circuitry 120 may then be configured to apply the frequency offset to an uplink transmission to the network node. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 9:
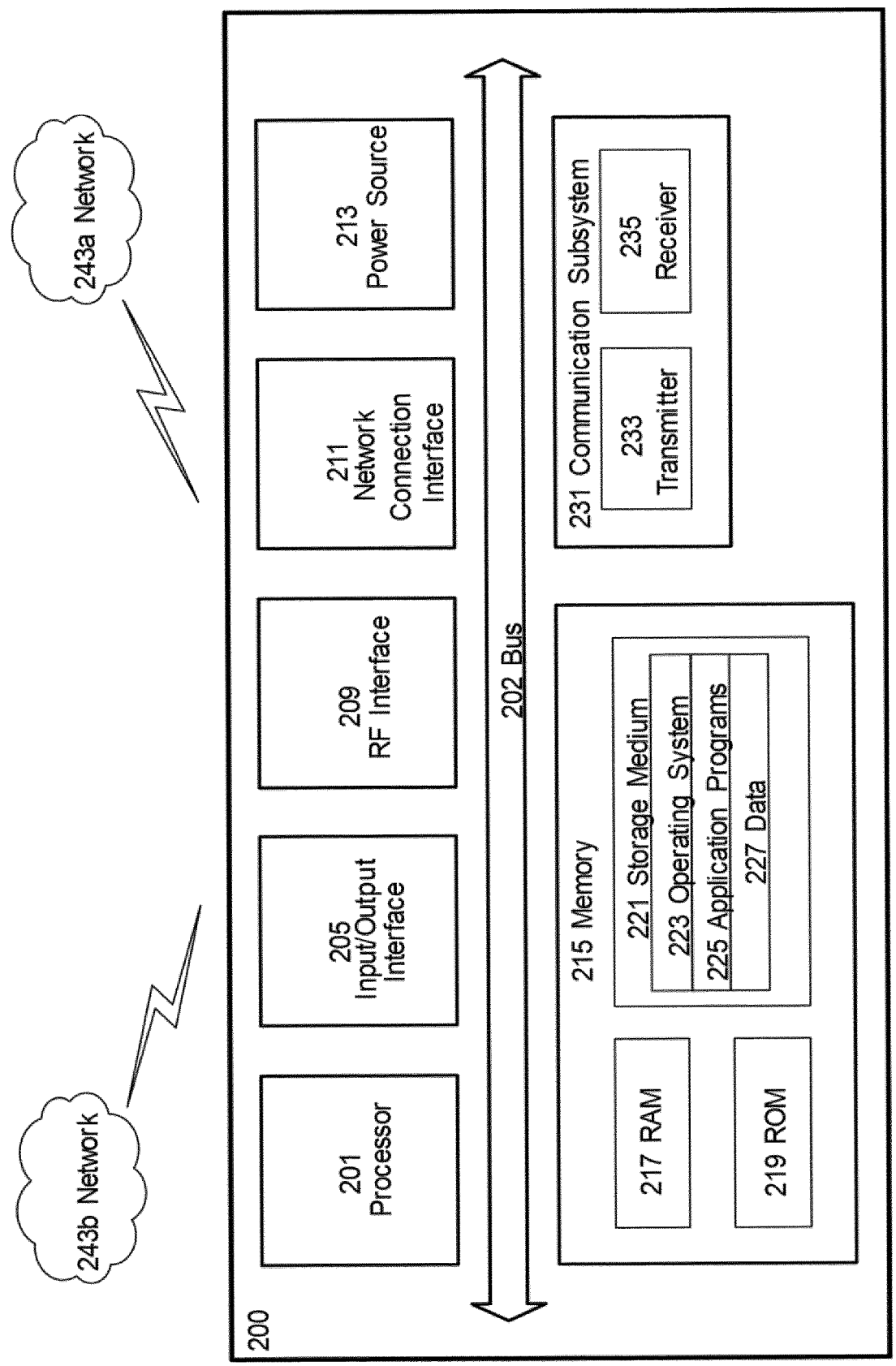
FIG. 9 illustrates an example of User Equipment, in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 9, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 9, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
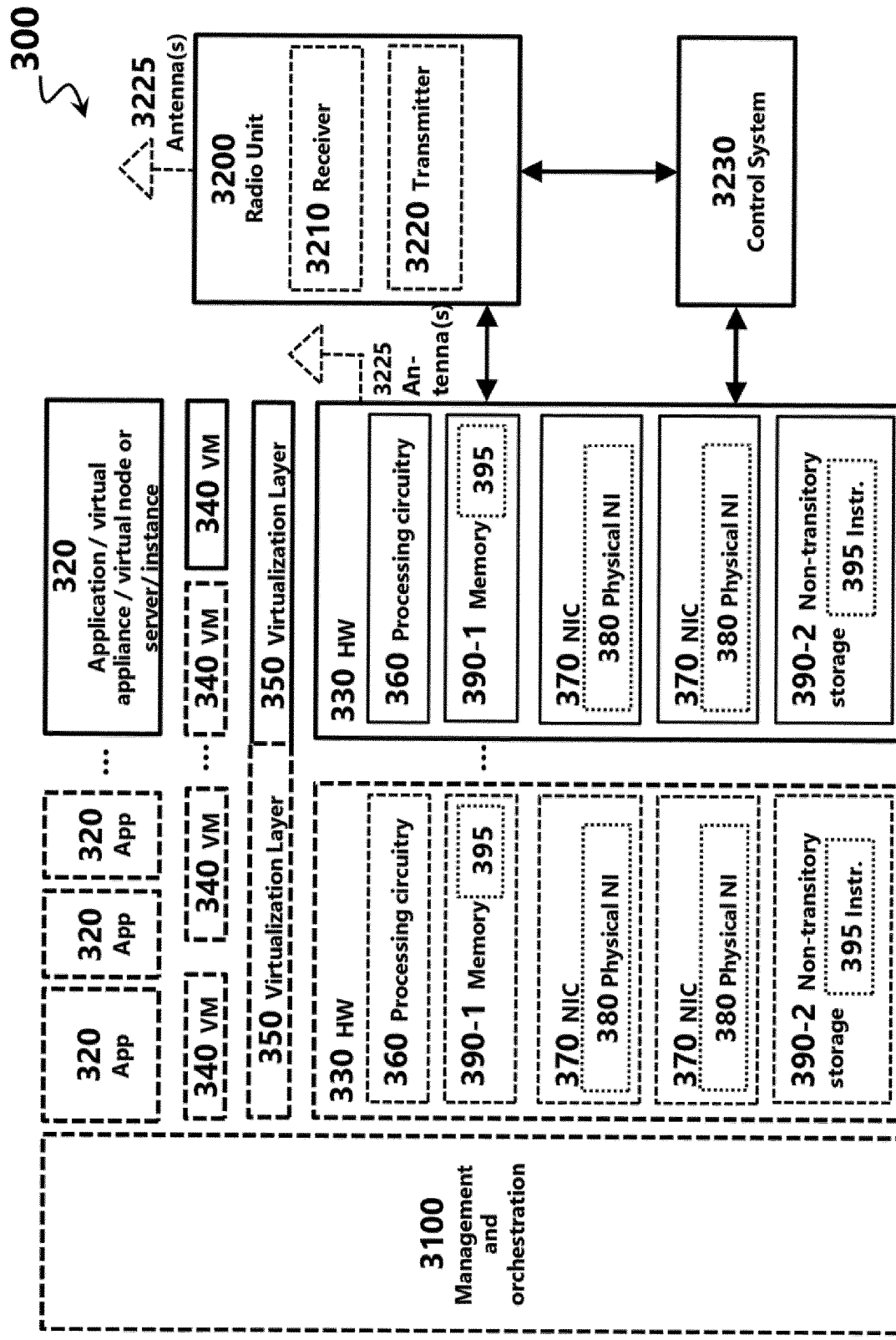
FIG. 10 illustrates an example of a virtualization environment, in accordance with some embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data centre or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centres, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 11:
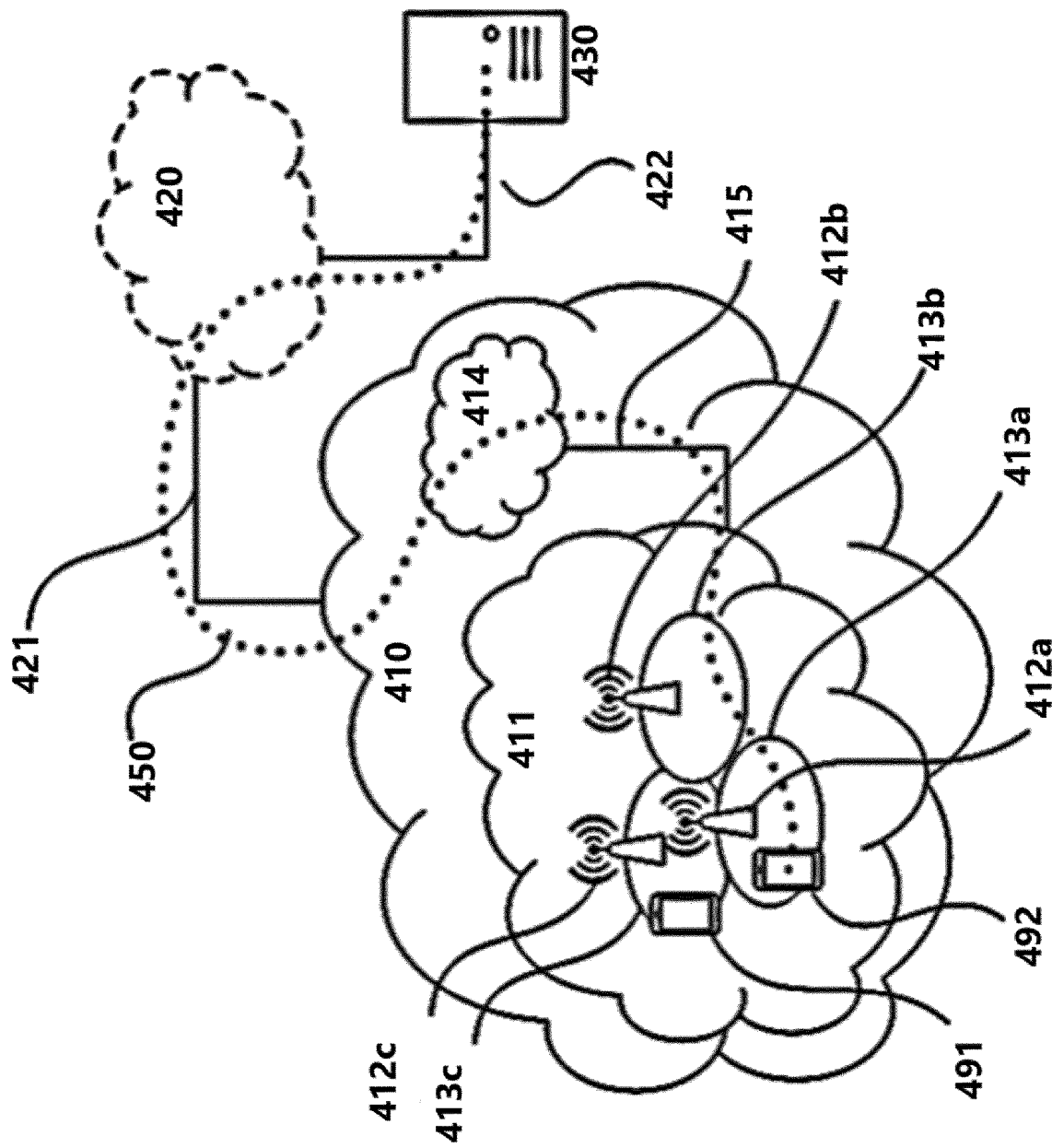
FIG. 11 illustrates an example of a telecommunication network connected via an intermediate network to a host computer, in accordance with some embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection. Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 12:
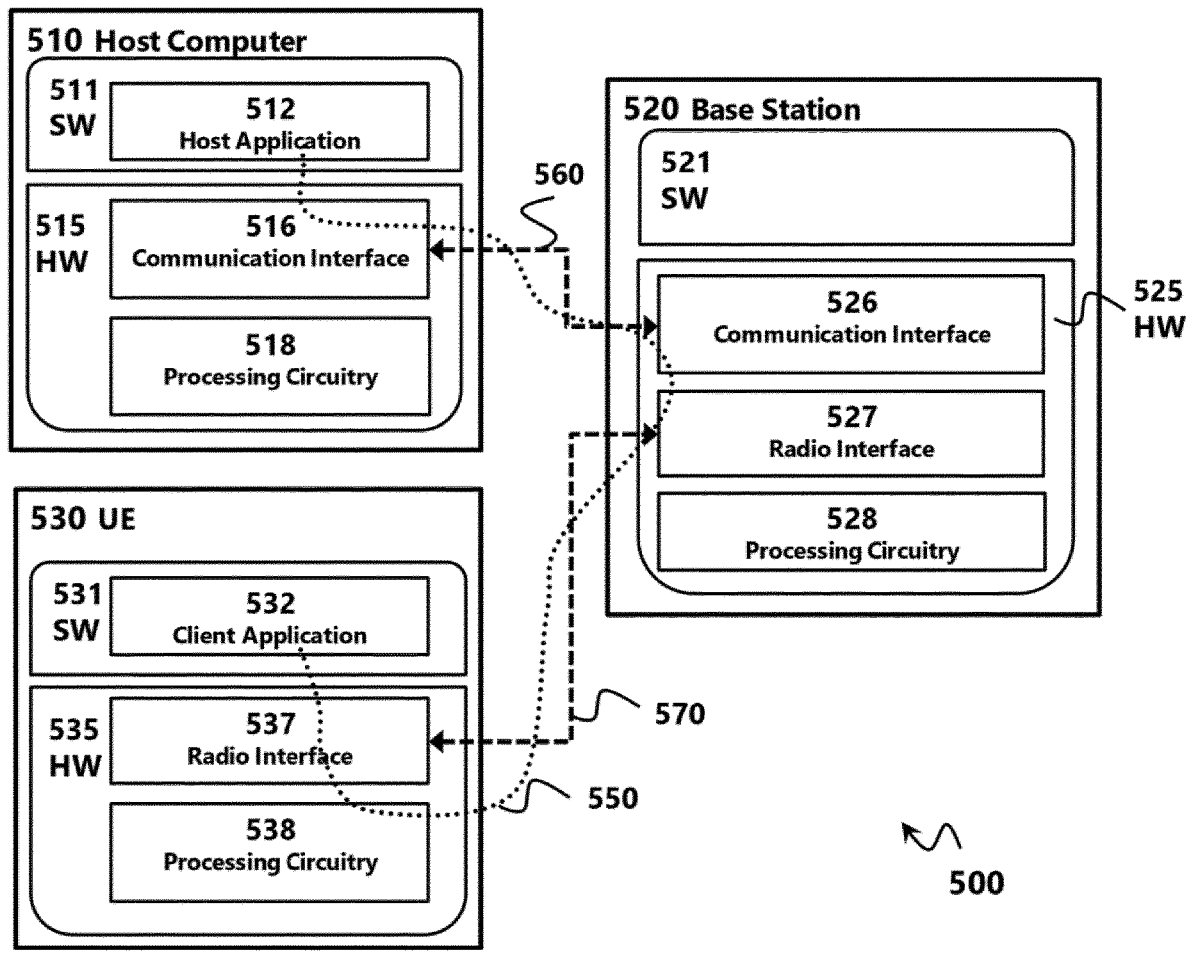
FIG. 12 illustrates an example of a host computer communicating via a base station with a user equipment over a partially wireless connection, in accordance with some embodiments.

It is noted that host computer 510, base station 520 and UE 530 illustrated in FIG. 12 may be similar or identical to host computer 430, one of base stations 412*a*, 412*b*, 412*c* and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the service availability and reliability and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 13, 14:
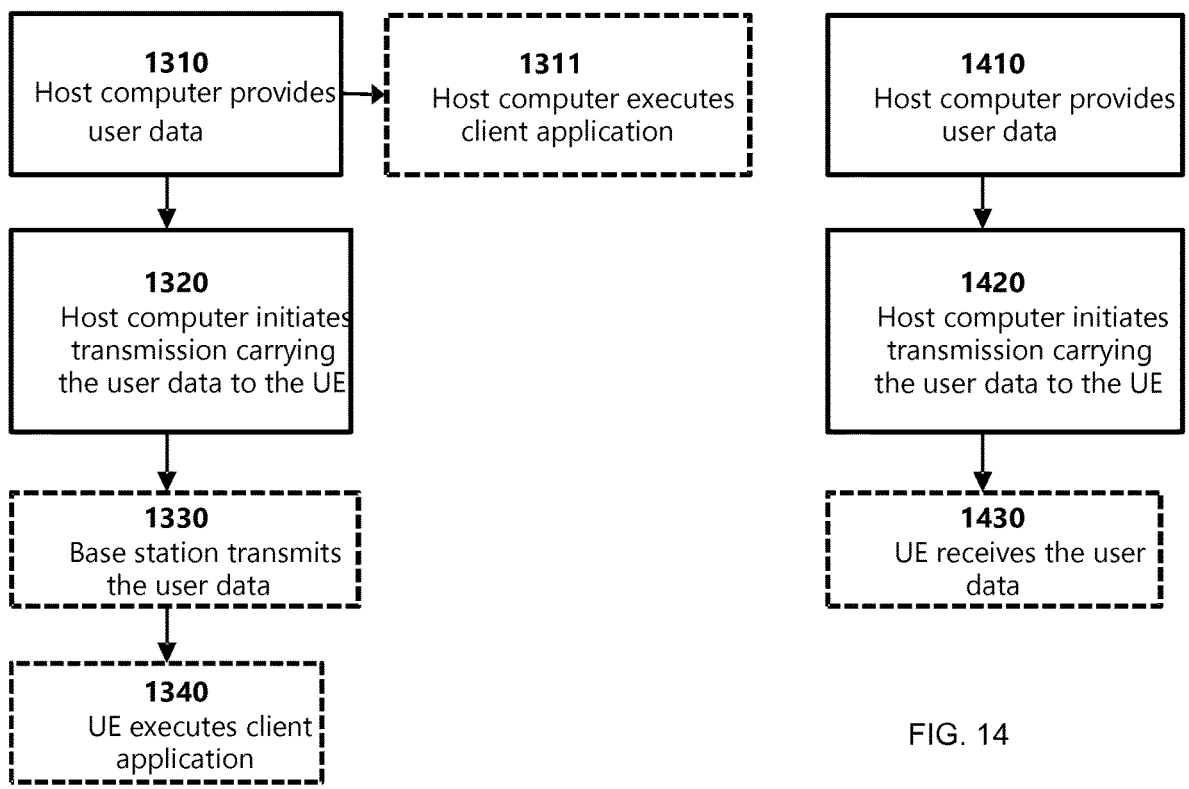
FIG. 13 illustrates an example of methods implemented in a communication system including a host computer, a base station and a user equipment, in accordance with some embodiments.
FIG. 14 illustrates an example of methods implemented in a communication system including a host computer, a base station and a user equipment, in accordance with some embodiments.

FIG. 13 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
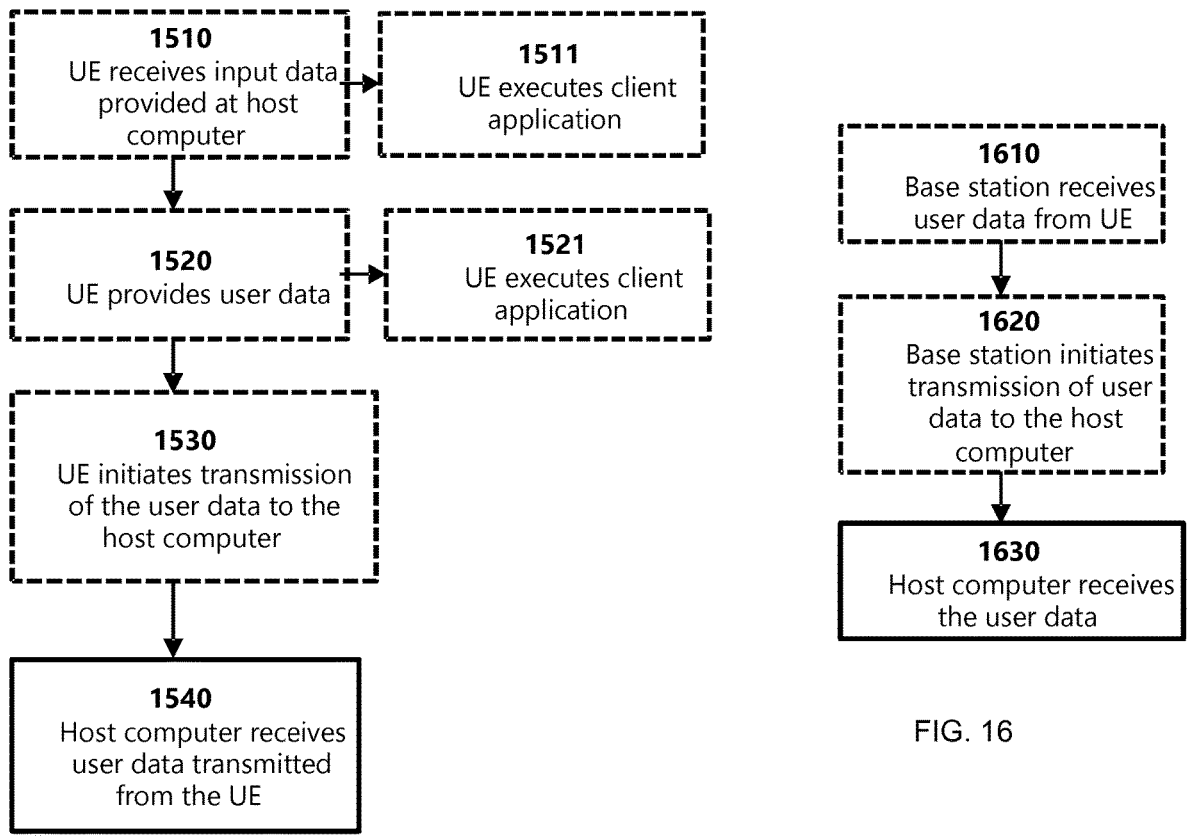
FIG. 15 illustrates an example of methods implemented in a communication system including a host computer, a base station and a user equipment, in accordance with some embodiments.
FIG. 16 illustrates an example of methods implemented in a communication system including a host computer, a base station and a user equipment, in accordance with some embodiments.

FIG. 15 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. In FIG. 17 an example virtual wireless device apparatus 1700 is depicted. The wireless device 1700 comprises an obtaining module 1710 comprising instructions for obtaining a frequency offset corresponding to a Doppler shift of transmission and or reception frequencies between the wireless device and a non-terrestrial network, NTN, comprising a network node and a communication satellite, wherein the network node is one of a terrestrial base station and a satellite base station or satellite gateway. The wireless device 1700 further comprises a transceiving module comprising instructions for transmitting frequency offset value and optionally for receiving frequency adjustment indication. The wireless device 1700 may optionally include other program modules comprising instructions to perform any one of the methods described herein, in relation to a wireless device or UE.

In FIG. 18 an example virtual network apparatus 1800 is depicted. The network node 1800 comprises determining module 1810 comprising instructions for determining a Doppler shift estimate for transmissions between the network node and a wireless device. The network node 1800 further comprises a transceiving module comprising instructions for transmitting frequency offset adjustment indication to the wireless device, based on the determined Doppler shift estimate and optionally for receiving frequency offset value. The network node 1800 may optionally include other program modules comprising instructions to perform any one of the methods described herein in relation to a network node or base station.

The processing circuitry of the described apparatus may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Examples

Group A
1. A method performed by a wireless device the method comprising:
    obtaining a frequency offset corresponding to a Doppler shift of transmission and or reception frequencies between the wireless device and a non-terrestrial network, NTN, comprising a network node and a communication satellite, wherein the network node is one of a terrestrial base station and a satellite base station or satellite gateway;
    applying the frequency offset to an uplink transmission to the network node.
2. The method of the previous example, wherein the frequency offset is received by the wireless device from the network node.
3. The method of any of the previous examples wherein the uplink transmission is part of an initial access procedure.
4. The method of any of the previous examples, further comprising receiving a frequency adjustment indication from the network node.
5. The method of any of the previous examples, wherein the applied frequency offset is transmitted to the network node.
6. The method of any of the previous examples wherein the uplink transmission is a first uplink transmission, the method further comprising:
    a. receiving a frequency adjustment indication in response the uplink transmission;
    b. adapting the uplink transmission frequency based on the received frequency adjustment indication;
    c. transmitting a second uplink transmission according to the adapted uplink transmission frequency.
7. The method of example 6, wherein the first uplink transmission is a Msg1 in a random access procedure, the received response is a Msg 2 in the random access procedure and the second uplink transmission is a Msg3 in the random access procedure.
8. The method of any of the previous examples wherein the frequency adjustment indication comprises one of:
    a. a relative increase or decrease of the used uplink frequency;
    b. an absolute frequency offset relative to the nominal transmit frequency.
9. The method of any of the previous examples, further comprising:
    a. receiving a broadcast indication of common portion of a Doppler shift, common to a plurality of wireless devices in a spotbeam footprint.
10. The method of the previous example, wherein the frequency offset is obtained by receiving a frequency adjustment indication from the network node, wherein the frequency adjustment indication corresponds to a differential between the common portion and the Doppler shift at a location of the wireless device
11. The method of any of the previous examples, wherein the frequency offset is obtained by estimating the Doppler shift based on at least one of:
    a. a position of a communication satellite via which the wireless device communicates with the network node;
    b. a velocity of the satellite;

c. a position of the wireless device, and
d. a velocity of the wireless device.

12. The method of example 11, wherein the position and/or velocity are determined using one or more of:
    a. a global navigation satellite system, GNSS;
    b. global positioning system, GPS;
    c. time difference of arrival, TDOA;
    d. estimated Doppler shift differences of downlink signals of two or more satellites.

13. The method of any of the preceding examples, wherein the frequency offset corresponds to a residual Doppler shift, wherein the residual Doppler shift is the difference in frequency between the actual Doppler shift and a pre-compensation or post-compensation to the actual Doppler shift for the wireless device.

14. The method of example 13, wherein the pre-compensation comprises a frequency offset being applied to a DL transmission received by the wireless device such that the Doppler shift at a reference point in a spot beam footprint is zero and the post-compensation comprises a frequency offset to be applied to an UL transmission such that the Doppler shift at a reference a point in a spot beam is zero and the residual Doppler shift corresponds to the difference between said reference point and the location of the wireless device.

15. The method of example 14, wherein the frequency offset is obtained by estimating the Doppler shift based at least on the reference point location.

16. The method of any of the previous examples wherein the Doppler shift is derived according to:

$$f_d = \frac{f_c}{c}(\overline{v}_{sat} - \overline{v}_{ue}) \cdot \overline{d}_{sat,ue}$$

wherein $f_c$ is the carrier frequency, c is the speed of light, $\overline{v}_{sat}$ is the velocity VECTOR OF THE SATELLITE, $\overline{v}_{ue}$ IS THE VELOCITY VECTOR OF THE WIRELESS DEVICE, $\overline{d}_{sat,ue}=(\overline{x}_{ue}-\overline{x}_{sat})/\|\overline{x}_{ue}-\overline{x}_{sat}\|$ is a unit length vector directed from the satellite position $\overline{x}_{sat}$ towards the wireless device position $\overline{x}_{ue}$, and · denotes dot product.

17. The method of any of the previous examples, wherein the frequency offset is determined as:
    −2f_d, relative to a nominal uplink, UL, transmission frequency to compensate for a Doppler shift in both downlink, DL, (the frequency offset in a received frequency reference) and UL (a frequency offset in a transmission from the wireless device to the network node), wherein nominal UL transmission frequency refers to an UL transmission frequency the wireless device has derived based on the frequency reference obtained from the received DL signal.

18. The method of any of the previous examples, wherein the frequency offset is determined as:
    (f (d,DL)+f (d,UL)) relative to a nominal uplink, UL, transmission frequency to compensate for Doppler shift in both downlink, DL, (the frequency offset in a received frequency reference) and UL (the frequency offset in the transmission from the wireless device to the network node), wherein, f_(d,DL)=f_(c,DL)/c(v⁻_sat-v⁻_ue)·d⁻_(sat,ue) and f_(d,UL)=f_(c,UL)/c(v⁻_sat-v⁻_ue)·d⁻_ (sat,ue) and nominal UL transmission frequency refers to the UL transmission frequency the wireless device has derived based on the frequency reference obtained from the received DL signal.

19. The method of any of the previous examples, further comprising:
    receiving an indication from the network node corresponding to a variation in Doppler shift over time.

20. The method of the previous example, wherein the indication from the network node corresponding to a variation in Doppler shift over time comprises one of:
    a. a further frequency adjustment indication;
    b. a time for which the frequency adjustment indication is valid;
    c. configuring the wireless device with a plurality of frequency adjustments/offsets and durations for which each offset is valid.

21. The method of any of the previous examples wherein the indication is received in a field of a downlink control information, DCI.

22. The method of any of the previous examples further comprising:
    a. determining a variation in received DL transmission frequencies and wherein the obtained frequency offset corresponds to at least the variation in the received DL transmission frequency and a previously obtained frequency offset.

23. The method of the previous examples further comprising
    a. receiving a parameter value corresponding to a Doppler frequency variation, wherein the obtained frequency offset corresponds to at least the variation in the received DL transmission frequency and a previously obtained frequency offset when the determined variation in the received DL transmission frequency exceeds the parameter value.

24. The method of the previous examples wherein the parameter value comprises a range of values.

25. The method of any of the previous examples, further comprising
    a. providing user data; and
    b. forwarding the user data to a host computer via the transmission to the network node.

Group B

26. A method performed by a network node, in a non-terrestrial network, the non-terrestrial network comprising a network node, and a communications satellite, wherein the network node is one of a terrestrial base station and a satellite base station or satellite gateway, the method comprising:
    a. determining a Doppler shift estimate for transmissions between the network node and a wireless device;
    b. transmitting a frequency adjustment indication to the wireless device, based on the determined Doppler shift estimate.

27. The method of the previous example, wherein the frequency adjustment indication is sent in one of:
    a. a radio resource control message
    b. a medium access control message
    c. a downlink control information message.

28. The method of any of the previous examples, wherein the frequency adjustment indication comprises one of:
    a. a relative increase or decrease of the used uplink frequency;
    b. an absolute frequency offset relative to the nominal transmit frequency.

29. The method of any of the previous examples, wherein, the network node determines the Doppler shift estimate based on a random access message received from the wireless device and the frequency adjustment indication is transmitted to the wireless device in a random access response message.
30. The method of any of the previous examples, further comprising applying guard bands between physical random access channel resources and scanning for random access requests from wireless devices, wherein the network node applies varying Doppler shift estimations to detect a random access request from the wireless device.
31. The method of any of the previous examples, wherein the Doppler shift estimate is based on frequency offset estimations on a signal transmitted from the wireless device.
32. The method of the previous example, wherein the signal transmitted from the wireless device comprises any one of:
    a. a physical uplink control channel signal;
    b. a physical uplink shared channel signal;
    c. an uplink reference signal.
33. The method of any of the previous examples, further comprising:
    a. determining a variation in Doppler shift over time;
    b. sending an indication to the wireless device corresponding to the variation in Doppler shift.
34. The method of the previous example, wherein determining the variation in Doppler shift over time comprises:
    a. Predicting a trajectory of the communication satellite.
35. The method of any of the previous 2 examples, wherein the indication of the variation in Doppler shift comprises any one of:
    a. a further frequency adjustment indication;
    b. a time for which the frequency adjustment indication is valid;
    c. configuring the wireless device with a plurality of frequency adjustments/offsets and durations for which each offset is valid
36. The method of any one of the previous examples wherein the Doppler shift estimate comprises a portion common to a plurality of wireless devices in a spot-beam footprint the method further comprising broadcasting an indication corresponding to the common portion of the Doppler shift and wherein the transmitted frequency adjustment indication corresponds to a differential between the common portion and the Doppler shift at a location of the wireless device.
37. The method of any one of the previous examples wherein the Doppler shift estimate comprises a portion common to a plurality of wireless devices in a spot-beam footprint the method further comprising broadcasting an indication corresponding to the common portion of the Doppler shift and wherein the transmitted frequency adjustment indication corresponds to a differential between the common portion and the Doppler shift at a location of the wireless device.
38. The method of any of the previous examples, further comprising
    a. receiving user data from a host computer; and
    b. forwarding the user data to the wireless device.

Group C
39. A wireless device comprising:
    a. processing circuitry configured to perform any of the steps of any of the Group A examples; and
    b. power supply circuitry configured to supply power to the wireless device.
40. A network node/base station comprising:
    a. processing circuitry configured to perform any of the steps of any of the Group B examples;
    b. power supply circuitry configured to supply power to the wireless device.
41. A communication system including a host computer comprising:
    a. processing circuitry configured to provide user data; and
    b. a communication interface configured to forward the user data to a cellular network for transmission to a user equipment (wireless device),
    c. wherein the cellular network comprises a non-terrestrial network comprising a communication satellite and a network node, wherein the network node is one of a terrestrial base station and a satellite base station or satellite gateway; the network node having a radio interface and processing circuitry, the base station's processing circuitry configured to perform any of the steps of any of the Group B examples.
42. The communication system of the pervious example further including the network node.
43. The communication system of the previous 2 examples, further including the wireless device, wherein the wireless device is configured to communicate with the base station.
44. The communication system of the previous 3 examples, wherein:
    a. the processing circuitry of the host computer is configured to execute a host application, thereby providing the user data; and
    b. the wireless device comprises processing circuitry configured to execute a client application associated with the host application.
45. A method implemented in a communication system including a host computer, a non-terrestrial network comprising a communication satellite and a network node, wherein the network node is one of a terrestrial base station and a satellite base station or satellite gateway and a user equipment (wireless device), the method comprising:
    a. at the host computer, providing user data; and
    b. at the host computer, initiating a transmission carrying the user data to the wireless device via a cellular network comprising the network node, wherein the network node performs any of the steps of any of the Group B examples.
46. The method of the previous example, further comprising, at the base station, transmitting the user data.
47. The method of the previous 2 examples, wherein the user data is provided at the host computer by executing a host application, the method further comprising, at the wireless device, executing a client application associated with the host application.
48. A user equipment (UE) configured to communicate with a base station, the UE comprising a radio interface and processing circuitry configured to performs the of the previous 3 examples.

The invention claimed is:
1. A method performed by a wireless device for operating in a non-terrestrial network, NTN, the NTN including at least one network node and a communication satellite, the at least one network node being one of a terrestrial base station, a satellite base station and satellite gateway, the method comprising:
obtaining a frequency offset corresponding to at least one of a Doppler shift of transmission and reception frequencies between the wireless device and the network node;
applying the frequency offset to an uplink transmission to the network node,
the uplink transmission being part of an initial access procedure; and
receiving an indication from the network node corresponding to a variation in Doppler shift over time, the indication including at least one of:
a further frequency adjustment indication;
a time for which the frequency adjustment indication is valid; and
configuring the wireless device with a plurality of frequency offsets and a corresponding duration for which each frequency offset of the plurality of frequency offsets is valid.

2. The method of claim 1, further comprising receiving a frequency adjustment indication from the network node.

3. The method of claim 1, wherein the applied frequency offset is transmitted to the network node.

4. The method of claim 1, the method further comprising:
receiving a frequency adjustment indication in response the uplink transmission;
adapting the uplink transmission frequency based on the received frequency adjustment indication; and
transmitting a second uplink transmission according to the adapted uplink transmission frequency.

5. The method of claim 2 wherein the frequency adjustment indication comprises one of:
a relative increase or decrease of the used uplink frequency;
an absolute frequency offset relative to the nominal transmit frequency.

6. The method of claim 1, further comprising:
receiving a broadcast indication of common portion of a Doppler shift, common to a plurality of wireless devices in a spotbeam footprint.

7. The method of claim 6, wherein the frequency offset is obtained by receiving a frequency adjustment indication from the network node, wherein the frequency adjustment indication corresponds to a differential between the common portion and the Doppler shift at a location of the wireless device.

8. The method of claim 2 wherein the indication is received in a field of a downlink control information, DCI.

9. The method of claim 1, further comprising:
receiving a parameter value corresponding to a Doppler frequency variation, wherein the obtained frequency offset corresponds to at least one variation in received Downlink (DL) transmission frequency and a previously obtained frequency offset when determined the at least one variation in the received DL transmission frequency exceeds the parameter value.

10. The method of claim 9 wherein the parameter value comprises a range of values.

11. A method performed by a network node, in a non-terrestrial network, the non-terrestrial network including a network node and a communications satellite, the network node being one of a terrestrial base station, a satellite base station and satellite gateway, the method comprising:
determining a Doppler shift estimate for transmissions between the network node and a wireless device;
transmitting a frequency adjustment indication to the wireless device, based on the determined Doppler shift estimate, the frequency adjustment indication being sent in one of:
a radio resource control message;
a medium access control message; and
a downlink control information message;
determining a variation in Doppler shift over time; and
sending an indication to the wireless device corresponding to the variation in Doppler shift, the indication of the variation in Doppler shift including at least one of:
a further frequency adjustment indication;
a time for which the frequency adjustment indication is valid; and
configuring the wireless device with a plurality of frequency adjustments/offsets and durations for which each offset is valid.

12. The method of claim 11, wherein the frequency adjustment indication comprises one of:
a relative increase or decrease of the used uplink frequency; and
an absolute frequency offset relative to the nominal transmit frequency.

13. The method of claim 11, wherein, the network node determines the Doppler shift estimate based on a random access message received from the wireless device and the frequency adjustment indication is transmitted to the wireless device in a random access response message.

14. The method of claim 11, wherein the Doppler shift estimate comprises a portion common to a plurality of wireless devices in a spotbeam footprint the method further comprising broadcasting an indication corresponding to the common portion of the Doppler shift and wherein the transmitted frequency adjustment indication corresponds to a differential between the common portion and the Doppler shift at a location of the wireless device.

15. A wireless device comprising a power supply, memory, and processing circuitry, the processing circuitry configured to:
obtain a frequency offset corresponding to at least one of a Doppler shift of transmission and reception frequencies between the wireless device and a non-terrestrial network, NTN, network node, the network node being one of a terrestrial base station, a satellite base station and satellite gateway;
apply the frequency offset to an uplink transmission to the network node, the uplink transmission being part of an initial access procedure; and
receive an indication from the network node corresponding to a variation in Doppler shift over time, the indication including at least one of:
a further frequency adjustment indication;
a time for which the frequency adjustment indication is valid; and
configuring the wireless device with a plurality of frequency offsets and a corresponding duration for which each frequency offset of the plurality of frequency offsets is valid.

16. A network node comprising a power supply, memory and processing circuitry, the processing circuitry configured to:
determine a Doppler shift estimate for transmissions between the network node and a wireless device; and
cause the network node to transmit a frequency adjustment indication to the wireless device, based on the determined Doppler shift estimate, the frequency adjustment indication being sent in one of:

a radio resource control message;
a medium access control message; and
a downlink control information message;
determine a variation in Doppler shift over time; and
send an indication to the wireless device corresponding to the variation in Doppler shift, the indication of the variation in Doppler shift including at least one of:
a further frequency adjustment indication;
a time for which the frequency adjustment indication is valid; and
configuring the wireless device with a plurality of frequency adjustments/offsets and durations for which each offset is valid.

17. A non-transitory computer readable storage medium comprising instructions which when executed on a computer perform a method for a wireless device for operating in a non-terrestrial network, NTN, the NTN including at least one network node and a communication satellite, the at least one network node being one of a terrestrial base station, a satellite base station and satellite gateway, the method comprising:

obtaining a frequency offset corresponding to at least one of a Doppler shift of transmission and reception frequencies between the wireless device and the network node; and applying the frequency offset to an uplink transmission to the network node, the uplink transmission being part of an initial access procedure; and receiving an indication from the network node corresponding to a variation in Doppler shift over time, the indication including at least one of:
a further frequency adjustment indication;
a time for which the frequency adjustment indication is valid; and
configuring the wireless device with a plurality of frequency offsets and a corresponding duration for which each frequency offset of the plurality of frequency offsets is valid.

* * * * *